United States Patent
Lakshminarayanan et al.

(10) Patent No.: US 10,165,251 B2
(45) Date of Patent: *Dec. 25, 2018

(54) FRAME COMPATIBLE DEPTH MAP DELIVERY FORMATS FOR STEREOSCOPIC AND AUTO-STEREOSCOPIC DISPLAYS

(71) Applicants: DOLBY INTERNATIONAL AB, Amsterdam (NL); Dolby Laboratories Licensing Corporation, San Francisco, CA (US)

(72) Inventors: Gopi Lakshminarayanan, Fremont, CA (US); Samir Hulyalkar, Los Gatos, CA (US); Tao Chen, Palo Alto, CA (US); Klaas Heinrich Schueuer, Berlin (DE); Amit Gulati, San Mateo, CA (US); Hariharan Ganapathy, Santa Clara, CA (US); Philipp Kraetzer, Berlin (DE)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 307 days.

This patent is subject to a terminal disclaimer.

(21) Appl. No.: 14/406,173

(22) PCT Filed: Jun. 12, 2013

(86) PCT No.: PCT/US2013/045447
§ 371 (c)(1),
(2) Date: Dec. 5, 2014

(87) PCT Pub. No.: WO2013/188552
PCT Pub. Date: Dec. 19, 2013

(65) Prior Publication Data
US 2015/0201178 A1    Jul. 16, 2015

Related U.S. Application Data

(60) Provisional application No. 61/659,588, filed on Jun. 14, 2012, provisional application No. 61/712,131, (Continued)

(51) Int. Cl.
*H04N 13/161* (2018.01)
*H04N 13/128* (2018.01)
(Continued)

(52) U.S. Cl.
CPC ......... *H04N 13/161* (2018.05); *H04N 13/128* (2018.05); *H04N 13/139* (2018.05);
(Continued)

(58) Field of Classification Search
CPC .......... H04N 13/0468; H04N 13/0022; H04N 13/0011; H04N 13/004; H04N 13/0029
(Continued)

(56) References Cited

U.S. PATENT DOCUMENTS 8,619,852 B2    12/2013    Leontaris
8,780,998 B2    7/2014    Pandit
(Continued)

FOREIGN PATENT DOCUMENTS

CN    102100070    6/2011
TW    201143368    12/2011
(Continued)

OTHER PUBLICATIONS

Dolby's Frame Compatible Full Resolution (FCFR) 3D System Specifications. Dolby Laboratories Inc. Dec. 2010.
(Continued)

*Primary Examiner* — Tung T Vo

(57) ABSTRACT

Stereoscopic video data and corresponding depth map data for stereoscopic and auto-stereoscopic displays are coded
(Continued)

using a coded base layer and one or more coded enhancement layers. Given a 3D input picture and corresponding input depth map data, a side-by-side and a top-and-bottom picture are generated based on the input picture. Using an encoder, the side-by-side picture is coded to generate a coded base layer Using the encoder and a texture reference processing unit (RPU), the top-and-bottom picture is encoded to generate a first enhancement layer, wherein the first enhancement layer is coded based on the base layer stream, and using the encoder and a depth-map RPU, depth data for the side-by-side picture are encoded to generate a second enhancement layer, wherein the second enhancement layer is coded based on to the base layer. Alternative single, dual, and multi-layer depth map delivery systems are also presented.

20 Claims, 17 Drawing Sheets

Related U.S. Application Data filed on Oct. 10, 2012, provisional application No. 61/739,886, filed on Dec. 20, 2012, provisional application No. 61/767,416, filed on Feb. 21, 2013, provisional application No. 61/807,013, filed on Apr. 1, 2013, provisional application No. 61/807,668, filed on Apr. 2, 2013, provisional application No. 61/822,060, filed on May 10, 2013.

(51) Int. Cl.
| | | |
|---|---|---|
| *H04N 13/139* | (2018.01) | |
| *H04N 19/597* | (2014.01) | |
| *H04N 19/117* | (2014.01) | |
| *H04N 19/154* | (2014.01) | |
| *H04N 19/187* | (2014.01) | |
| *H04N 19/59* | (2014.01) | |
| *H04N 13/00* | (2018.01) | |

(52) U.S. Cl.
CPC ......... *H04N 19/117* (2014.11); *H04N 19/154* (2014.11); *H04N 19/187* (2014.11); *H04N 19/59* (2014.11); *H04N 19/597* (2014.11); *H04N 2013/0081* (2013.01); *H04N 2213/005* (2013.01)

(58) Field of Classification Search
USPC ...................................................... 348/42, 43
See application file for complete search history.

(56) References Cited

U.S. PATENT DOCUMENTS

| | | | |
|---|---|---|---|
| 8,885,721 B2 | 11/2014 | Tourapis | |
| 8,923,403 B2 | 12/2014 | Chen | |
| 2003/0035001 A1* | 2/2003 | Van Geest | ......... H04N 13/0468 715/753 |
| 2003/0198290 A1 | 10/2003 | Millin | |
| 2009/0015662 A1* | 1/2009 | Kim | ..................... H04N 19/593 348/43 |
| 2010/0103249 A1 | 4/2010 | Lipton | |
| 2010/0165077 A1 | 7/2010 | Yin | |
| 2010/0310155 A1* | 12/2010 | Newton | ............. H04N 13/0055 382/154 |
| 2010/0315489 A1 | 12/2010 | Shepherd | |
| 2011/0122131 A1* | 5/2011 | Bruls | ................. H04N 13/0022 345/419 |
| 2011/0122230 A1 | 5/2011 | Boisson | |
| 2011/0261050 A1* | 10/2011 | Smolic | .................... G06T 15/20 345/419 |
| 2011/0280311 A1 | 11/2011 | Chen | |
| 2012/0026288 A1 | 2/2012 | Tourapis | |
| 2012/0092452 A1 | 4/2012 | Tourapis | |
| 2013/0009955 A1* | 1/2013 | Woo | .................... H04N 13/0011 345/419 |
| 2013/0135435 A1* | 5/2013 | D'Amato | ........... H04N 13/0022 348/43 |
| 2013/0182944 A1* | 7/2013 | Martin | .................... G06T 15/00 382/154 |
| 2013/0188014 A1* | 7/2013 | Won | .................... H04N 13/0059 348/43 |
| 2013/0229487 A1* | 9/2013 | D'Amato | ............. H04N 13/004 348/43 |
| 2014/0341293 A1 | 11/2014 | Chen | |
| 2014/0368610 A1* | 12/2014 | Grangetto | .......... H04N 13/0029 348/43 |
| 2014/0376612 A1 | 12/2014 | Chen | |
| 2015/0201178 A1* | 7/2015 | Lakshminarayanan | ...................... H04N 13/0048 348/43 |
| 2015/0302592 A1* | 10/2015 | Bruls | .................... G06T 7/0051 348/44 |
| 2016/0050404 A1* | 2/2016 | Bruls | ................. H04N 13/0029 348/43 |

FOREIGN PATENT DOCUMENTS

| | | |
|---|---|---|
| WO | 98/39927 | 9/1998 |
| WO | 2012/007867 | 1/2012 |
| WO | 2012/012584 | 1/2012 |
| WO | 2012/014171 | 2/2012 |
| WO | 2012/020358 | 2/2012 |
| WO | 2012/067399 | 5/2012 |
| WO | 2012/070500 | 5/2014 |

OTHER PUBLICATIONS

ITU-T and ISO/IEC JTC 1, "Advanced Video Coding for Generic Audiovisual Services" ITU-T Recommendation H.264 and ISO0/IEC 14496-10, 2009.
Hewage, Chaminda, T.E.R et al. "Quality Evaluation of Color Plus Depth Map-Based Stereoscopic Video" IEEE Journal of Selected Topics in Signal Processing, vol. 3, No. 2, Apr. 2009, pp. 304-318.
Vetro, A. et al. "3D-TV Content Storage and Transmission" IEEE Transactions on Broadcasting, vol. 57, No. 2, Jun. 2011, pp. 384-394.
Scharstein, D. et al "High-Accuracy Stereo Depth Maps Using Structured Light" IEEE Computer Society Conference on Computer Vision and Pattern Recognition, vol. 1 pp. 195-202, Madison, WI, Jun. 2003.
Siping, T et al "Joint Texture and Depth Map Video Coding Based on the Scalable Extension of H.264/AVC" IEEE Circuits and Systems, May 24, 2009, pp. 2353-2356.

* cited by examiner

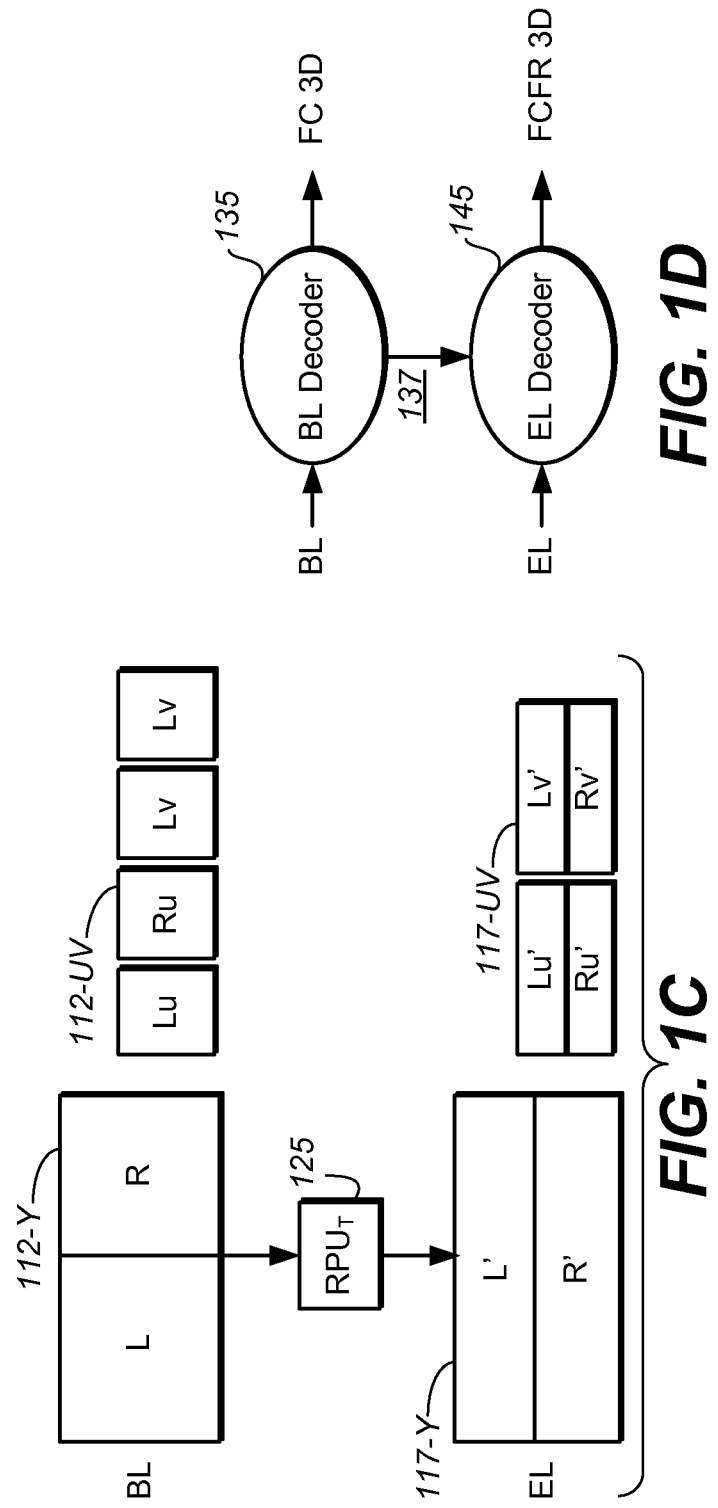

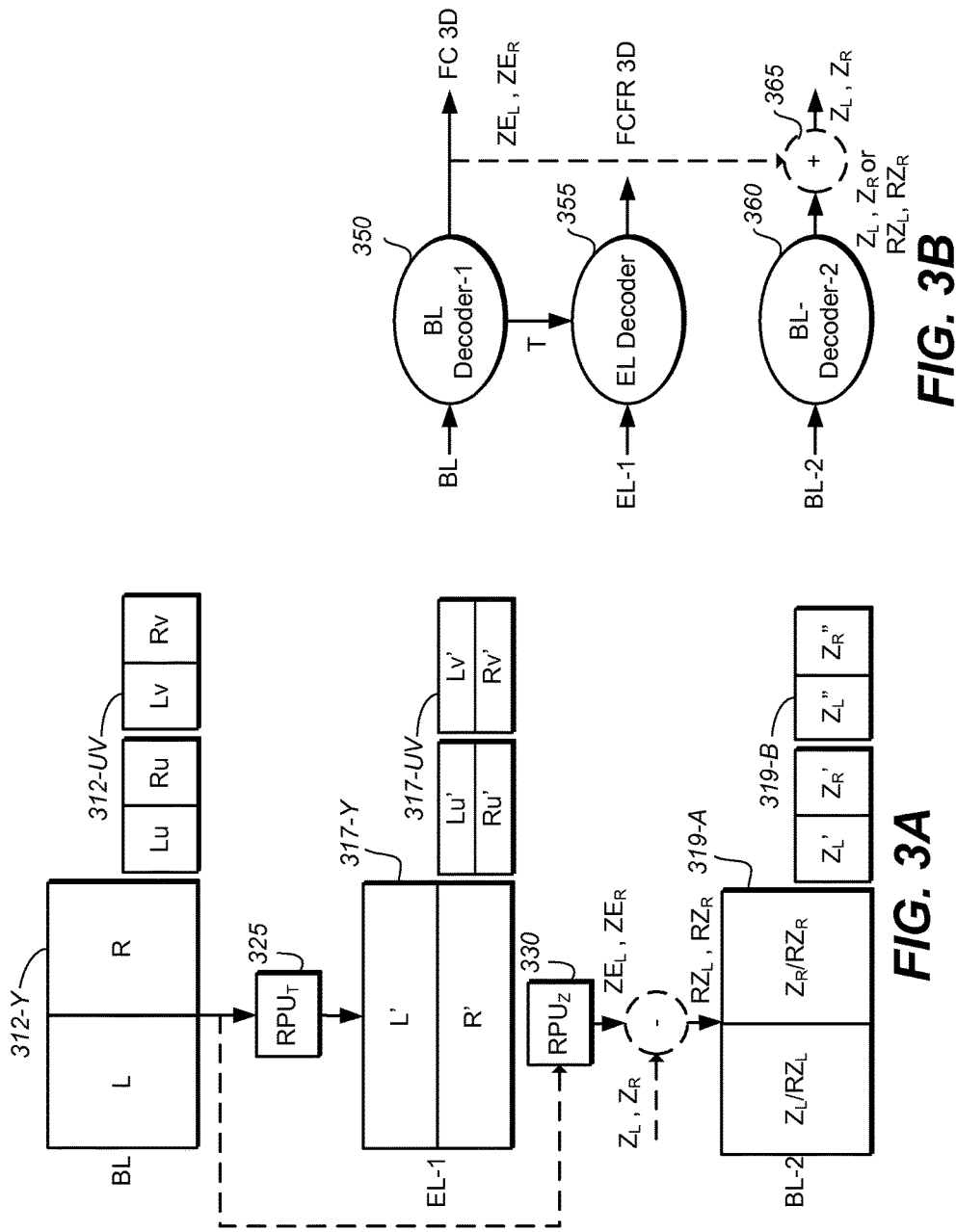

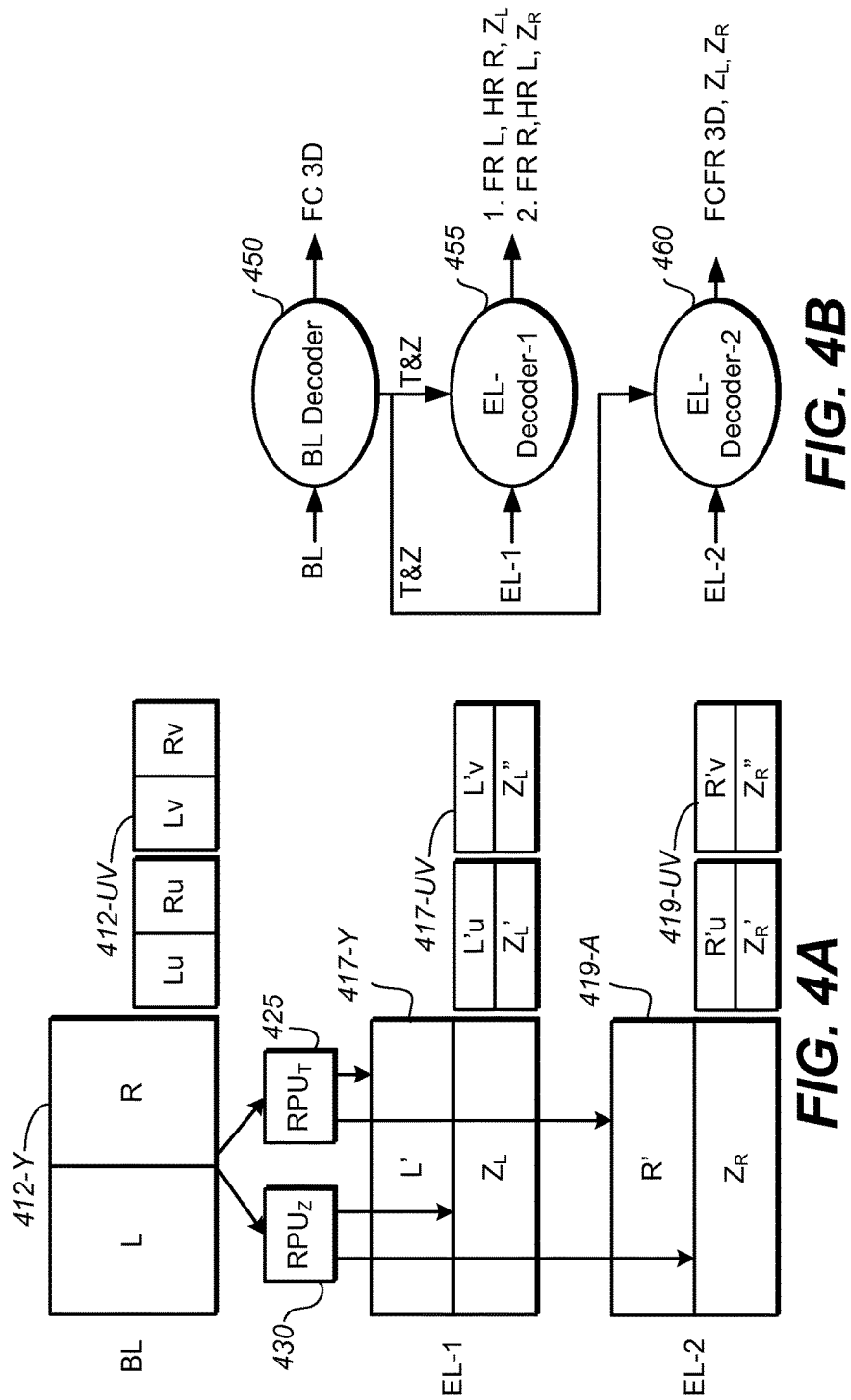

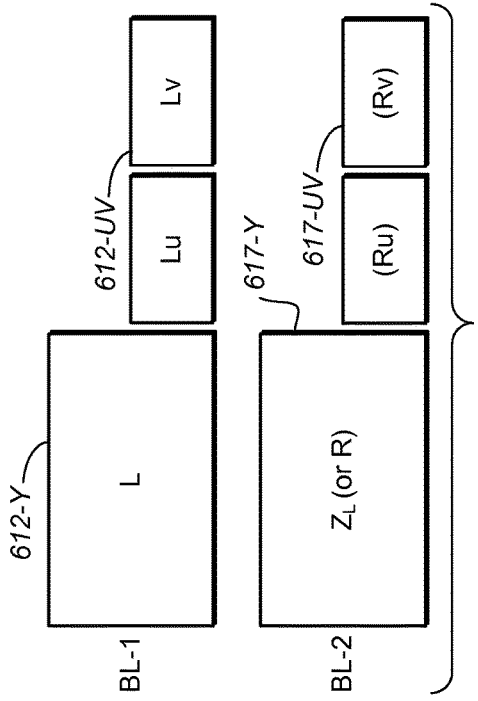
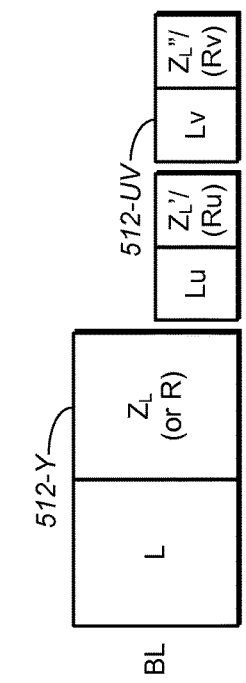
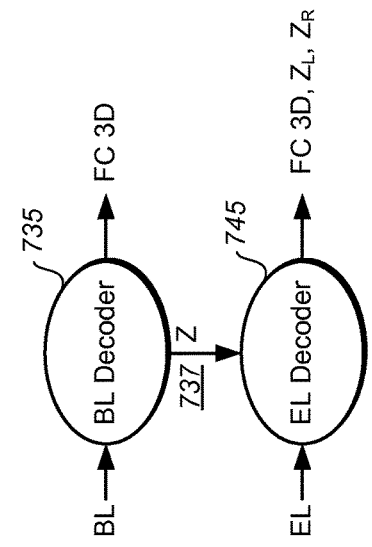

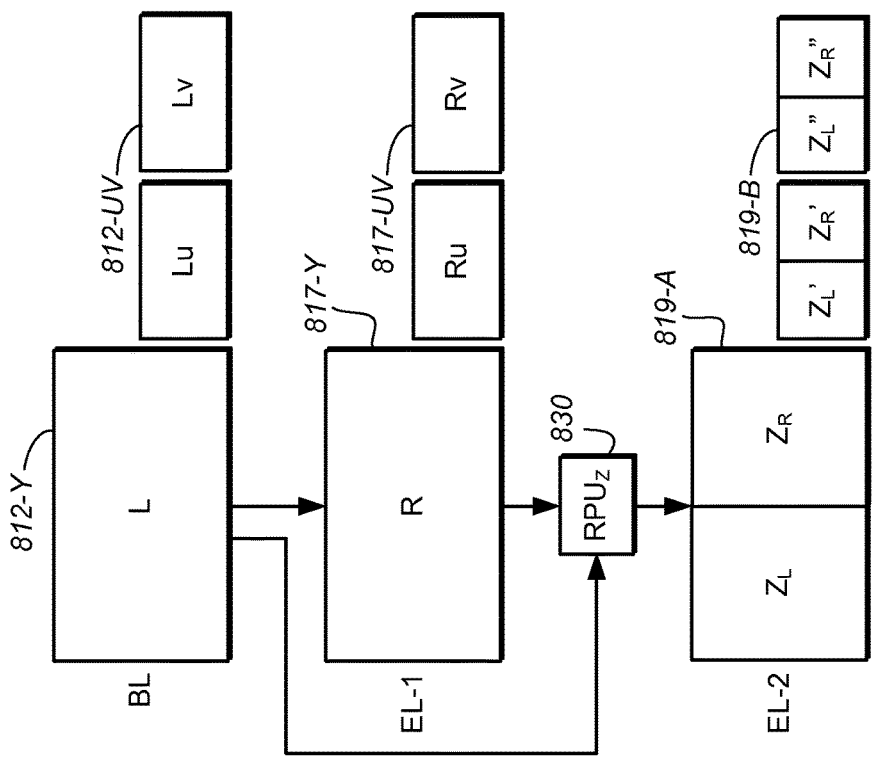
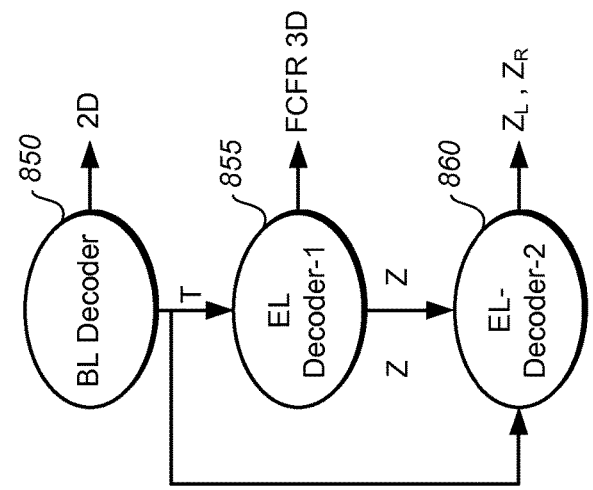
FIG. 8A
FIG. 8B

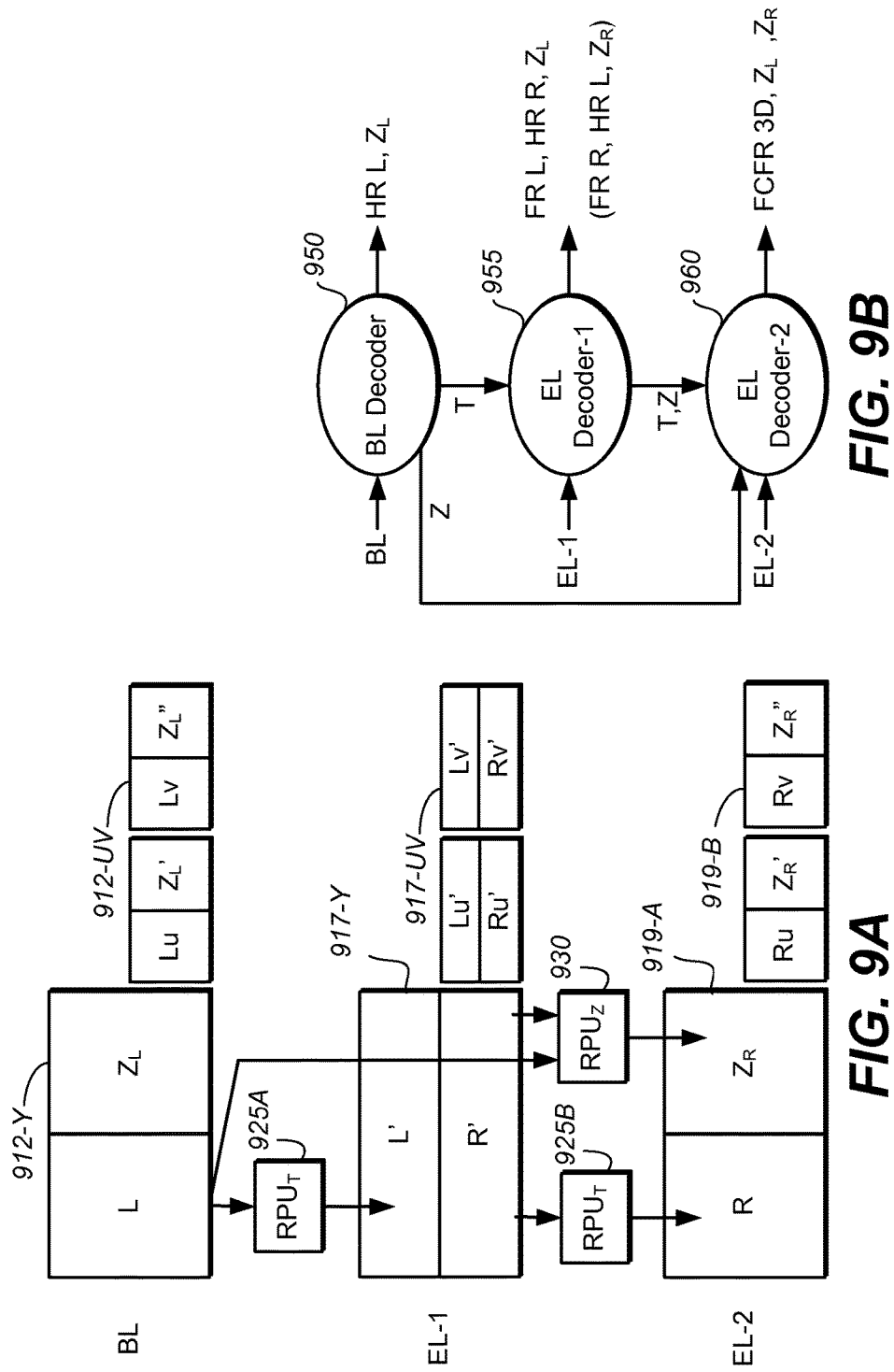

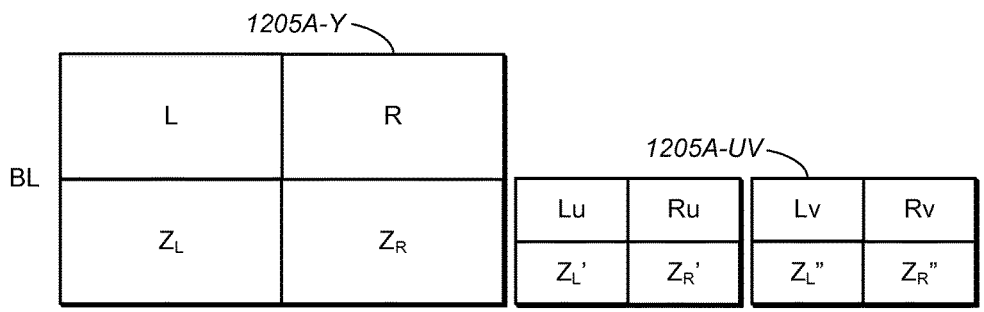
*FIG. 12A*
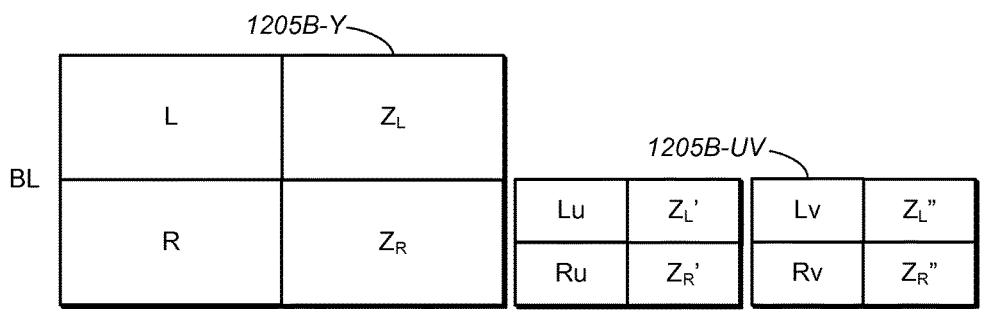
*FIG. 12B*
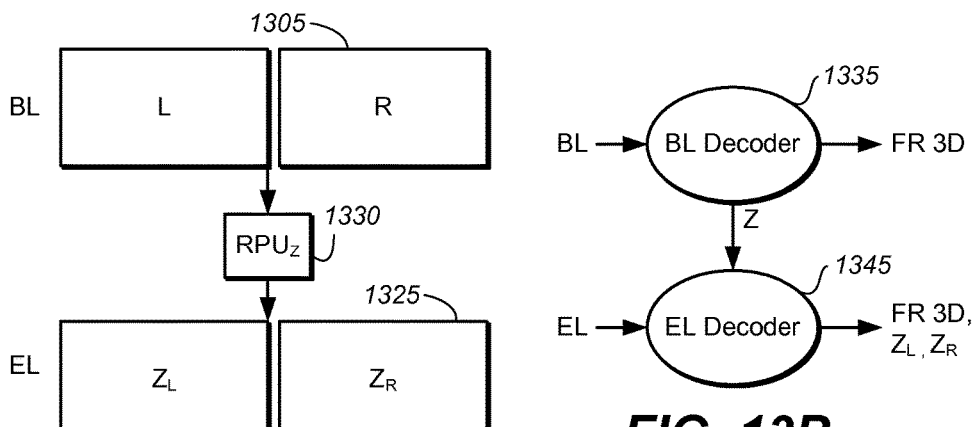
*FIG. 13A*
*FIG. 13B*

FRAME COMPATIBLE DEPTH MAP DELIVERY FORMATS FOR STEREOSCOPIC AND AUTO-STEREOSCOPIC DISPLAYS

CROSS-REFERENCE TO RELATED APPLICATIONS

This application claims priority to U.S. Provisional Patent Application No. 61/659,588 filed on 14 Jun. 2012; U.S. Provisional Patent Application No. 61/712,131 filed on 10 Oct. 2012; U.S. Provisional Patent Application No. 61/739,886 filed on 20 Dec. 2012; U.S. Provisional Patent Application No. 61/767,416 filed on 21 Feb. 2013; United States Provisional Patent Application No. 61/807,013 filed on 1 Apr. 2013; U.S. Provisional Patent Application No. 61/807,668 filed on 2 Apr. 2013; and U.S. Provisional Patent Application No. 61/822,060 filed on 10 May 2013, the contents of which are all incorporated herein by reference.

TECHNOLOGY

The present invention relates generally to images. More particularly, an embodiment of the present invention relates to formats for the delivery of depth maps for stereoscopic and auto-stereoscopic displays

BACKGROUND 3D video systems garner great interest for enhancing a consumer's experience, whether at the cinema or in the home. These systems use stereoscopic or auto-stereoscopic methods of presentation, including:

(i) anaglyph—provides left/right eye separation by filtering the light through a two color filter, commonly red for one eye, and cyan for the other eye;

(ii) linear polarization—provides separation at the projector by filtering the left eye through a linear polarizer (commonly) oriented vertically, and filtering the right eye image through a linear polarizer oriented horizontally;

(iii) circular polarization—provides separation at the projector by filtering the left eye image through a (commonly) left handed circular polarizer, and filtering the right eye image through a right handed circular polarizer;

(iv) shutter glasses—provides separation by multiplexing the left and right images in time, and (v) spectral separation—provides separation at the projector by filtering the left and right eye spectrally where the left and right eye each receives a complementary portion of the red, green, and blue spectrums.

Most of the 3D displays available in the market today are stereoscopic TVs, requiring the user to wear special 3D glasses in order to experience the 3D effect. Delivery of 3D content to these displays only requires carrying two separate views: a left view and a right view. Auto-stereoscopic (glasses-free) displays are in the horizon. These displays provide some amount of motion parallax; the viewer can move his/her head around as if they are viewing objects from different angles as they move around.

Traditional stereoscopic displays provide a single 3D view; however, auto-stereoscopic displays are required to provide multiple views such as five views, nine views, 28 views, etc., based on the design of the display. When regular stereoscopic content is provided to auto-stereoscopic displays, the displays extract depth maps and create or render multiple views based on this depth map. As used herein, the term "depth map" denotes an image or other bit-stream that contains information related to the distance of the surfaces of scene objects from a viewpoint. A depth map can be readily converted to a disparity map, and in the context of this document the terms depth map and disparity map are the same and inter-changeable.

The depth map also may be used for retargeting the 3D experience for different displays types with different resolutions (e.g., 1080p displays or 2K displays). There have been a number of studies showing the amount of depth designed for 3D Cinema is not suitable for smaller mobile devices and vice-versa. Also there is viewer preference to the amount of 3D depth, which can be age-dependent (the young prefer a larger depth experience than the old), culture-dependent (Asian cultures prefer higher depth than Western cultures), or simply viewer dependent. The depth map information could be used to re-render the stereo views to increase or decrease the perceived depth and other adjustments. As appreciated by the inventors here, improved techniques for delivering depth map information along with the content are desirable for improving the user experience with auto-stereoscopic and stereoscopic displays. It is further appreciated that these improved techniques preferably are backwards compatible with existing single-view and 3D systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 1C depicts a simplified representation of a 3D FCFR format with no depth data; FIG. 1D depicts a simplified representation of the corresponding decoder;

FIG. 3A depicts an example 3-layer depth map delivery format according to an embodiment of the present invention; FIG. 3B depicts examples of corresponding bitstreams that can be extracted by suitable decoders;

FIG. 4A depicts an example 3-layer depth map delivery format according to an embodiment of the present invention; FIG. 4B depicts examples of corresponding bitstreams that can be extracted by suitable decoders;

FIG. 5 depicts an example single-layer depth map delivery format according to an embodiment of the present invention;

FIG. 6 depicts an example dual-layer depth map delivery format according to an embodiment of the present invention;

FIG. 7A depicts an example 2-layer depth map delivery format according to an embodiment of the present invention; FIG. 7B depicts examples of corresponding bitstreams that can be extracted by suitable decoders;

FIG. 8A depicts an example 3-layer depth map delivery format according to an embodiment of the present invention; FIG. 8B depicts examples of corresponding bitstreams that can be extracted by suitable decoders;

FIG. 9A depicts an example 3-layer depth map delivery format according to an embodiment of the present invention; FIG. 9B depicts examples of corresponding bitstreams that can be extracted by suitable decoders;

FIG. 12A and FIG. 12B depict examples of single layer depth map delivery formats according to embodiments of the present invention;

FIG. 13A depicts an example 2-layer depth map delivery format according to an embodiment of the present invention; FIG. 13B depicts examples of corresponding bitstreams that can be extracted by suitable decoders;

DESCRIPTION OF EXAMPLE EMBODIMENTS

Figure 1A:
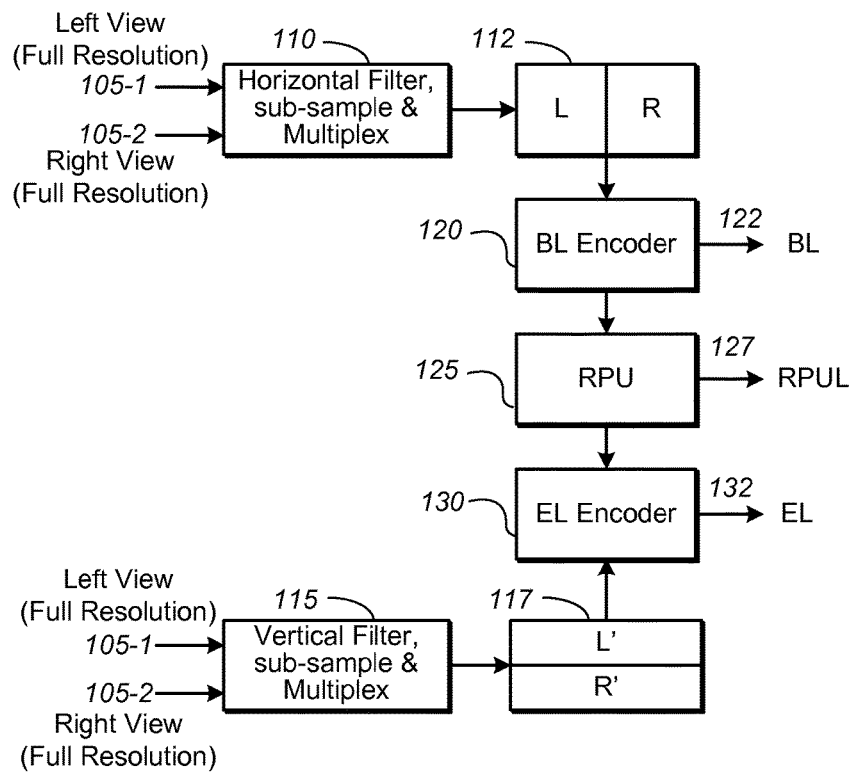
FIG. 1A and FIG. 1B depict example Frame-Compatible-Full-Resolution (FCFR) encoders and decoders for 3D video.

Delivery formats for depth maps for stereoscopic and auto-stereoscopic displays are described herein. The formats support a variety of video delivery scenarios, including traditional cable, satellite, or over the air broadcasting and over-the-top delivery. In some embodiments, the formats allow legacy decoders to extract a backwards-compatible 2D or 3D stream while newer decoders can render multiple views and associated depth map data for either stereoscopic or auto-stereoscopic displays. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to delivery formats for depth map information for stereoscopic and auto-stereoscopic displays. Given a 3D input picture and corresponding input depth map data, a side-by-side and a top-and-bottom picture are generated based on the input picture. Using an encoder, the side-by-side picture is coded to generate a coded base layer Using the encoder and a texture reference processing unit (RPU), the top-and-bottom picture is encoded to generate a first enhancement layer, wherein the first enhancement layer is coded partially based on the base layer stream. Using the encoder and a depth-map RPU (denoted as Z-RPU or RPUz in the following), depth data for the side-by-side picture are encoded to generate a second enhancement layer, wherein the second enhancement layer is partially coded based on to the base layer.

In some embodiments, instead of coding directly depth map data into the base and enhancement layers, the encoder may encode residual depth map data, the residual depth data comprising differences between the input depth map data and estimated depth map data generated by a Z-RPU.

In some embodiments, depth map data and video data are encoded into a single layer, the single layer comprising half-resolution data of a first view and either half resolution data of the second view or depth map data for the half-resolution data of the first view;

In some embodiments, depth map data and video data are encoded into two base layers. A first base layer comprises full resolution data of a first view, while a second base layer comprises either full resolution data of a second view or full-resolution depth data of the first view.

In some embodiments, depth map data and video data are encoded in three layers. The base layer comprises half-resolution data of a first view and its corresponding depth map data. A first enhancement layer comprises a top-and-bottom picture, and a second enhancement layer comprises half-resolution data of a second view and its corresponding depth map data.

In some embodiments, depth map data and video data are encoded into two layers. The base layer comprises both the luminance and the chroma components of a side-by-side picture. The enhancement layer's luma component comprises the luma components of a top-and-bottom picture, and the enhancement layer's chroma component comprises depth map data for the top-and-bottom picture.

In some embodiments, the side-by-side picture and the top-to-bottom pictures are padded so their horizontal and vertical spatial dimensions are integer multiples of a pre-defined macroblock size (e.g., 16). Then, the padded data comprise sub-sampled versions of the original depth map data.

In some embodiments, chroma pixel values in an enhancement layer may also be replaced with depth map data or residual depth map data.

Example FCFR Format for 3D

FIG. 1A depicts an example of a Frame Compatible Full-Resolution (FCFR) encoder of 3D video data without any depth information. The encoder operates according to the methods described in U.S. Provisional patent application 61/541,005, "Dual-layer frame-compatible full-resolution stereoscopic 3D delivery," by T. Chen et al., filed on Sep. 29, 2011, also filed on Sep. 26, 2012, as PCT Application with Ser. No. PCT/US2012/057302, incorporated herein by reference in its entirety.

As depicted in FIG. 1A, full resolution (e.g., 1920×1080), left and right views (105-1, 105-2) of an input 3D signal (105) are filtered, sub-sampled (horizontally or vertically), and multiplexed to generate a side-by-side view 112 and top-and-bottom view 117. The side-by-side and top-and-bottom pictures comprise both views of the input; but each view is at a lower resolution. For example, for a 1920×1080 input, the side-by-side sub-pictures (L, R) may be 960×1080 each, and the top-and-bottom sub-pictures (L', R') may be 1920×540 each. The side-by-side signal 112 is encoded by BL encoder 120 to generate a coded base layer (BL) bit-stream 122. BL encoder 120 may be any of the known video encoders, such as those specified by the ISO/IEC MPEG-2, MPEG-4 part 2, or H.264 (AVC) standards, or other encoders, such as Google's VP8, Microsoft's VC-1, HEVC, and the like.

Top-and-bottom signal 117 may be encoded by a second encoder, enhancement layer (EL) encoder 130, to generate coded enhancement layer (EL) stream 132. EL encoder may encode in the same format as BL encoder 120 (e.g., H.264), or in a separate format. In some embodiments, EL encoder 130 may encode signal 117 by using reference frames from both the top-and-bottom signal 117 and the side-by-side signal 112. For example, BL encoder 120, EL Encoder 130, and associated storage (not shown), may comprise a multi-view codec as specified by the ISO/IEC H.264 specification for a multi-view codec (MVC).

In some embodiments, the encoder of FIG. 1A may also include a Reference Processor Unit (RPU) 125. As used herein in relation to the RPU, the term "Reference" is not meant to imply or express, and should not be interpreted as meaning, that this picture is explicitly used as a reference within the complete coding process (e.g., in the sense of a "reference picture"). The RPU may conform to a description set forth in the following two patent application publications, filed pursuant to the Patent Cooperation Treaty (PCT), which are incorporated herein by reference for all purposes as if fully set forth herein: (1) WO 2010/123909 A1 by Tourapis, A., et al. for "Directed Interpolation/Post-processing Methods for Video Encoded Data"; and (2) WO 2011/005624 A1 by Tourapis, A., et al. for "Encoding and Decoding Architecture for Frame Compatible 3D Video Delivery." The following descriptions of the RPU apply, unless otherwise specified to the contrary, both to the RPU of an encoder and to the RPU of a decoder. Artisans of ordinary skill in fields that relate to video coding will understand the differences, and will be capable of distinguishing between encoder-specific, decoder-specific and generic RPU descriptions, functions and processes upon reading of the present disclosure. Within the context of a 3D video coding system as depicted in FIG. 1A, the RPU (125) accesses and interpolates decoded images from BL Encoder 120, according to a set of rules of selecting different RPU filters and processes.

The RPU 125 enables the interpolation process to be adaptive at a region level, where each region of the picture/sequence is interpolated according to the characteristics of that region. RPU 125 can use horizontal, vertical, or two dimensional (2D) filters, edge adaptive or frequency based region-dependent filters, and/or pixel replication filters or other methods or means for interpolation and image processing.

For example, one pixel replication filter may simply perform a zero-order-hold, e.g., each sample in the interpolated image will be equal to the value of a neighboring sample in a low resolution image. Another pixel replication filter may perform a cross-view copy operation, e.g., each interpolated sample in one view, will be equal to the non-interpolated co-located sample from the opposing view.

Additionally or alternatively, a disparity-compensated copy scheme can also be used in the RPU. For example, the filter may copy a non-collocated region of samples where the location of the region to be copied, which may also be a region from a different view, can be specified using a disparity vector. The disparity vector may be specified using integer or sub-pixel accuracy and may involve simple, e.g. translational motion parameter, or more complex motion models such as affine or perspective motion information and/or others.

An encoder may select RPU filters and outputs regional processing signals, which are provided as input data to a decoder RPU (e.g., 140). The signaling (e.g., RPUL 127) specifies the filtering method on a per-region basis. For example, parameters that relate to region attributes such as the number, size, shape and other characteristics are may be specified in an RPUL related data header. Some of the filters may comprise fixed filter coefficients, in which case the filter coefficients need not be explicitly signaled by the RPU. Other filter modes may comprise explicit modes, in which the filter parameters, such as coefficient values and number of horizontal/vertical taps are signaled explicitly.

The filters may also be specified per each color component. The RPU may specify linear filters. Non-linear filters such as edge-adaptive filters, bi-lateral filters, etc., may also be specified in the RPU. Moreover, prediction models that specify advanced motion compensation methods such as the affine or perspective motion models may also be signaled.

The RPU data signaling 127 can either be embedded in the encoded bitstream, or transmitted separately to the decoder. The RPU data may be signaled along with the layer on which the RPU processing is performed. Additionally or alternatively, the RPU data of all layers may be signaled within one RPU data packet, which is embedded in the bitstream either prior to or subsequent to embedding the layer 2 encoded data. The provision of RPU data may be optional for a given layer. In the event that RPU data is not available, a default scheme may thus be used for up-conversion of that layer. Not dissimilarly, the provision of an enhancement layer encoded bitstream is also optional.

An embodiment allows for multiple possible methods of optimally selecting the filters and filtered regions in each RPU. A number of criteria may be used separately or in conjunction in determining the optimal RPU selection. The optimal RPU selection criteria may include the decoded quality of the base layer bitstream, the decoded quality of the enhancement layer bitstreams, the bit rate required for the encoding of each layer including the RPU data, and/or the complexity of decoding and RPU processing of the data.

An RPU may be optimized independently of subsequent processing in the enhancement layer. Thus, the optimal filter selection for an RPU may be determined such that the prediction error between the interpolated base layer images and the original left and right eye images is minimized, subject to other constraints such as bitrate and filter complexity.

Figure 1B:
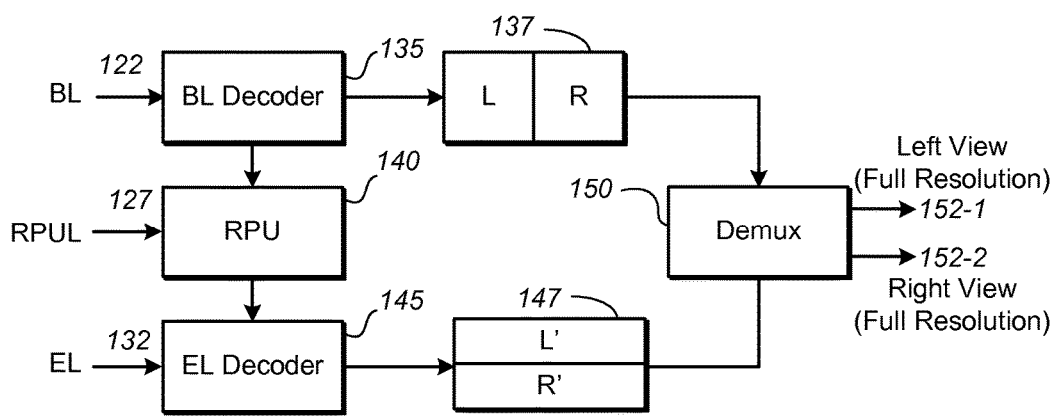

The RPU 125 may serve as a pre-processing stage that processes information from BL encoder 120, before utilizing this information as a potential predictor for the enhancement layer in EL encoder 130. Information related to the RPU processing may be communicated (e.g., as metadata) to a decoder as depicted in FIG. 1B using an RPU Layer (RPUL) stream 127. RPU processing may comprise a variety of image processing operations, such as: color space transformations, non-linear quantization, luma and chroma up-sampling, and filtering. In a typical implementation, the EL 132, BL 122, and RPUL 127 signals are multiplexed into a single coded bitstream (not shown).

FIG. 1B depicts an example decoder for decoding a bitstream encoded by the encoder depicted in FIG. 1A. The decoder will demultiplex the received bitstream to create a BL stream 122, an EL stream 132, and an RPUL stream 127.

Decoders with a single BL decoder 135 can decode BL stream 122 on its own to generate a decoded side-by-side bitstream 137. A decoder may use signal 137 to generate either a single 2D stream (by selecting either the left or right view of signal 137) or a backwards-compatible 3D stream. Decoders supporting an additional EL decoder 145 may also decode the top-and-bottom stream 147 and combine it with the BL stream 137 to generate a full-resolution 3D stream 152. The demultiplexing and combining of the top-and-bottom and side-by-side streams to create a full-resolution 3D video stream may be performed according to the methods described in U.S. Provisional patent application 61/541,005, referenced earlier.

BL decoder 135 (e.g., an MPEG-2 or H.264 decoder) corresponds to the BL encoder 120. EL decoder 145 (e.g., an MPEG-2 or H.264 decoder) corresponds to the EL Encoder 130. Decoder RPU 140 corresponds to the encoder RPU 125, and with guidance from RPUL input 127, may assist in the decoding of the EL layer 132 by performing operations corresponding to operations performed by the encoder RPU 125. FIG. 1C depicts a simplified representation of a 3D FCFR coded format as encoded by the dual layer encoder depicted in FIG. 1A. According to the notation of FIG. 1C, a coded BL signal includes a side-by-side signal 112, which comprises a luminance or luma component (112-Y) and a corresponding chroma component (112-UV). For example, in some embodiments, BL signal 112 may be encoded in a 4:2:0 YUV format. In some other embodiments it may be encoded in a 4:2:0 YCbCr format. As depicted in FIG. 1C, chroma components of an input signal may have a lower pixel resolution than the luma components; however, all methods described herein apply to color formats where chroma may be at the same resolution as the luma component (e.g., 4:4:4 YCbCr or 4:4:4 YUV). BL signal 112 may be encoded on its own using an encoder as depicted in FIG. 1A. An EL top-and-bottom stream 117 may be partially encoded using $RPU_T$ 125 based on reference data from the BL stream 112. EL stream 117 comprises its own luma (117-Y) and chroma (117-UV) components.

Given the coded bitstream generated by the encoder representation depicted in FIG. 1C, FIG. 1D depicts a simplified representation for the corresponding receiver embodiments. FIG. 1D can also be viewed as a simplified version of FIG. 1B. As explained before, a legacy decoder with a single BL decoder 135 can extract from this stream a legacy (e.g., half-resolution) frame compatible (FC) 3D stream, while a newer decoder (e.g., an H.264 MVC decoder, or a decoder with an EL decoder 145 and an RPU 140) may also extract the enhancement layer and thus reconstruct a higher-resolution and quality FCFR 3D stream. For notation purposes, a connection (e.g., 137) between two decoders, such as between BL decoder 135 and EL decoder 145, denotes that the EL decoder may utilize as reference frames, frames extracted and post-processed from the base layer, for example through a decoder RPU 140 (not shown). In other words, the coded EL stream is partially decoded based on data from the BL stream.

Example Depth Formats for 3D with Backwards-Compatible Layer

Figures 2A, 2B:
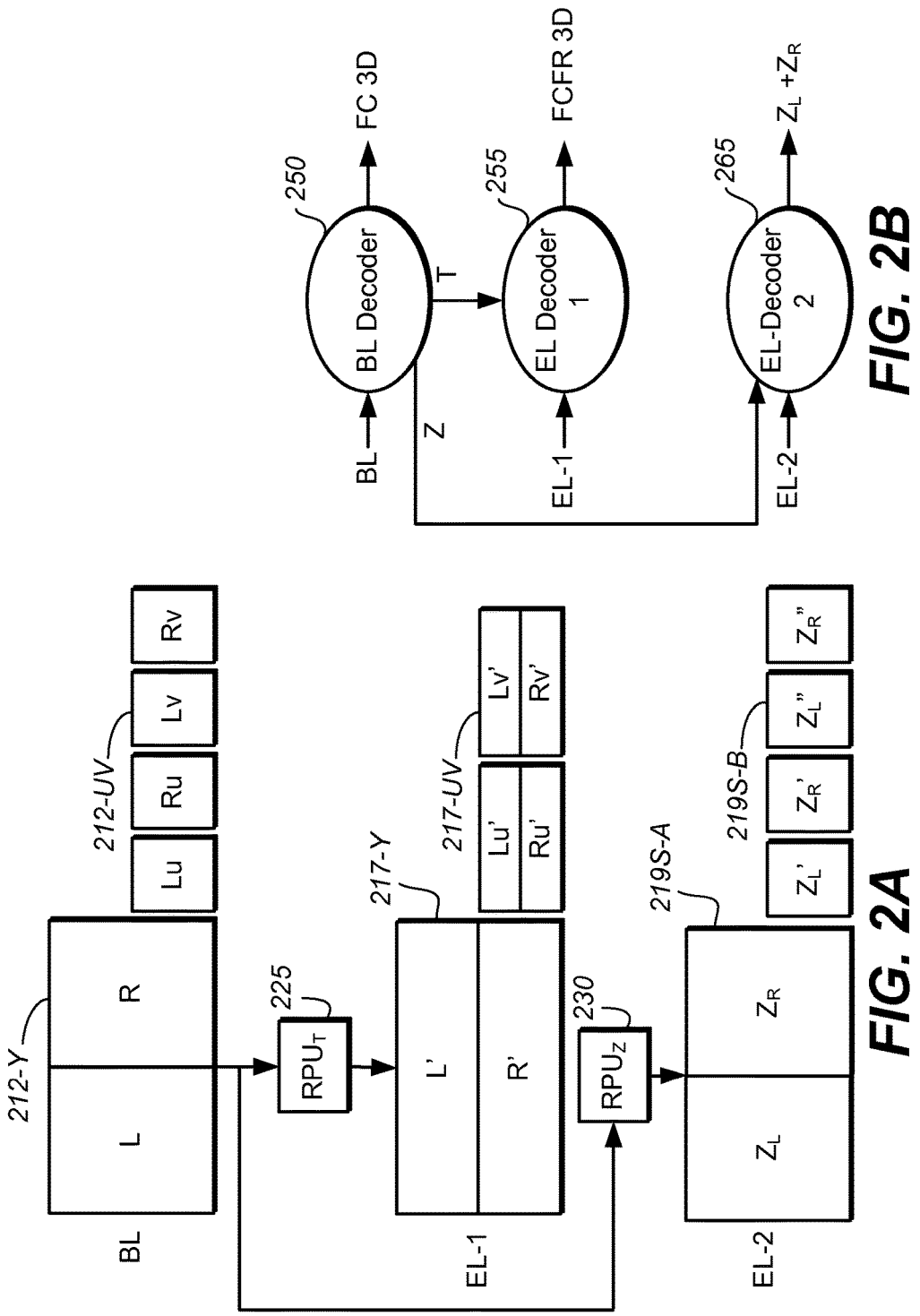
FIG. 2A depicts an example 3-layer depth map delivery format according to an embodiment of the present invention, where the base layer comprises a side-by-side 3D signal.
FIG. 2B depicts examples of corresponding bitstreams that can be extracted by suitable decoders.

FIG. 2A depicts an example three-layer delivery format for delivering depth map data in addition to FCFR 3D data. As noted in FIG. 2A, the first two layers, BL 212 and EL-1 217, correspond to the traditional 3D FCFR layers BL 112 and EL 117. Similar to 3D FCFR encoding, EL-1 layer 217 may be coded by reference to the BL layer 212 using $RPU_T$ 225. EL-2 layer 219S represents depth map information encoded as a primary channel 219S-A and as secondary channels 219S-B. Depth map data are typically encoded as 8-bit grayscale data; that is, they don't include any chroma information. In EL-2 219S, $Z_L$ represents horizontally sub-sampled depth data for the left view (e.g., 105-1) and $Z_R$ represents horizontally sub-sampled depth data for the right view (e.g., 105-2). Since in this embodiment the depth data are sub-sampled, missing depth information may also be incorporated into secondary depth channels 219S-B. For example, in an embodiment, given an original w×h depth map for the left view, after vertical sub-sampling, the resulting w×h/2 depth map may be split into two w/2×h/2 depth maps, denoted as $Z_{L'}$ and $Z_{L''}$.

EL-2 layer 219S may be encoded on its own using a second EL encoder, or as depicted in FIG. 2A, it can be encoded using $RPU_Z$ 230 by referencing depth data extracted from the BL stream 212.

Depth-map RPU 230 (also to be referred as $RPU_Z$ or Z-RPU, because it operates on depth or Z-buffer data) is very similar in operation and functionality to texture RPU 225 (or RPU 125) (also to be referred as $RPU_T$ because it operates on texture data), except it has the added functionality to extract (or predict) estimate depth-map data from a baseline input (e.g., BL 212). Depth map information can be extracted from 2D or 3D data using any of the known techniques in the art, such as, "High-Accuracy Stereo Depth Maps Using Structured Light," by Daniel Scharstein and Richard Szeliski, published in IEEE Computer Society Conference on Computer Vision and Pattern Recognition, vol. 1, pp. 195-202, June 2003, incorporated herein by reference in its entirety.

In some embodiments, the EL-2 layer 219S may carry the following data: original depth map without any modification (e.g., depth map as captured by a camera), or the difference between the original depth map and a depth map predicted by $RPU_Z$, or specific regions from an original depth map. The same format may also be used to carry various parameters needed for defining the $RPU_Z$ processing, either as part of the depth data or as part of a separate $RPU_Z$ bit stream, similar to the $RPU_T$ bit stream (e.g., 127).

Given the depth map coding format of FIG. 2A, depending on the capabilities of a receiver, FIG. 2B depicts a number of alternative decoded bit streams. For example, a receiver with a single decoder, BL decoder 250, can extract only a frame compatible (FC) 3D stream. A receiver with both BL decoder 250 and an EL decoder-1 255 (e.g., an MVC decoder) can also decode an FCFR 3D stream. A receiver with a second EL-decoder (265) and a decoder $RPU_Z$ (not shown) may also decode the depth maps $Z_L$ and $Z_R$. A receiver with BL decoder 250 and only EL decoder 2 (265), may decode an FC 3D stream and depth maps $Z_L$ and $Z_R$.

Figure 2C:
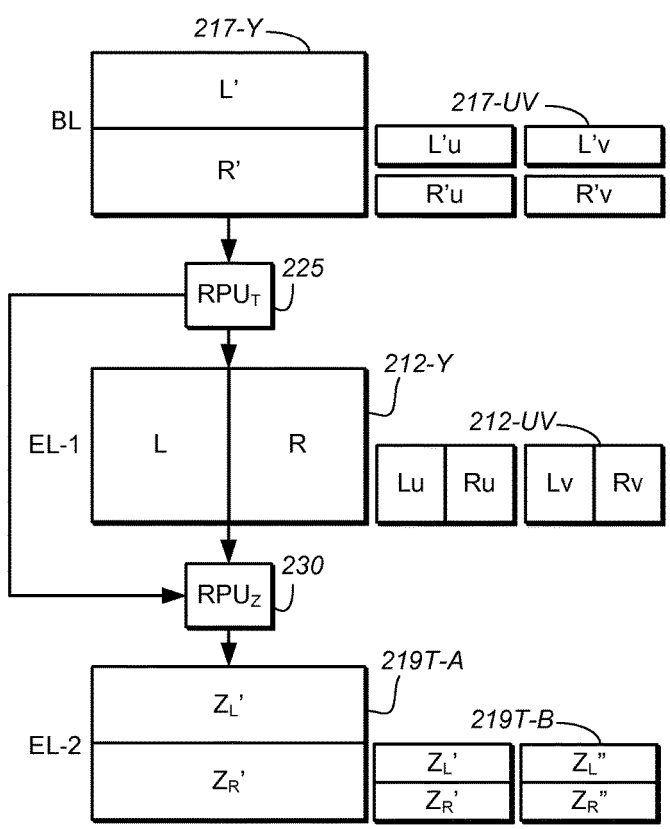
FIG. 2C depicts an example 3-layer depth map delivery format according to an embodiment of the present invention, where the base layer comprises a top-and-bottom 3D signal.

As depicted in FIG. 2A, the base layer 212 comprises side-by-side multiplexed L/R coded data (e.g., 112) and the EL-1 layer comprises top-and-bottom L'/R' multiplexed data (e.g., 117); however, in all of the delivery formats for depth maps discussed herein, using side-by-side 3D data in the base layer is inter-changeable with using top-and-bottom 3D data. Hence, as depicted in FIG. 2C, in an alternative embodiment, BL may comprise the top-and-bottom L'/R' signal 217 (e.g., 117), EL-1 may comprise the side-by-side L/R signal 212 (e.g., 112), and EL-2 may comprise top-and-bottom depth map data $Z_L'/Z_R'$ (219T). Similar embodiments may be derived for other example embodiments described in this specification.

FIG. 3A depicts a variation of the depth map delivery format depicted in FIG. 2A. As depicted in FIG. 3A, depth map data is coded using a second base layer, BL-2 319. To improve coding efficiency, instead of coding the original depth data $Z_L$ and $Z_R$, an encoder may utilize an optional $RPU_Z$ 330 to create estimate depth map data.

In an embodiment, $RPU_Z$ 330 may utilize information from base layer 312 to derive predicted depth data $ZE_L$ and $ZE_R$. Then, the encoder for BL-2, instead of coding directly $Z_L$ and $Z_R$, may encode the depth residuals $RZ_L=Z_L-ZE_L$ and $RZ_R=Z_R-ZE_R$. Similar depth map residual coding is applicable to all example embodiments described in this specification.

Given depth map data encoded according to FIG. 3A, depending on the capabilities of the receiver, FIG. 3B depicts alternative decoding scenarios. For example, a receiver with a single BL decoder, BL Decoder-1 350, may decode an FC 3D stream. A receiver with a second BL decoder (BL-Decoder-2 360) may decode either depth data $Z_L$ and $Z_R$ or residual depth data ($RZ_L$, $RZ_R$). A receiver with the second BL-decoder 360 and a decoder $RPU_Z$ may use the BL stream to reconstruct estimate depth data ($ZE_L$ and $ZE_R$), which can be added (e.g., via adder 365) to the decoded residual depth data ($RZ_L$, $RZ_R$) to generate output depth data $Z_L$ and $Z_R$. Note that the additional function 365 may be implemented by the decoder's $RPU_Z$ or by separate processing circuitry. Finally a receiver with BL-decoder-1 350 and EL-decoder 355 may use the bit stream EL-1 and reference data from the BL bit stream to reconstruct an FCFR 3D stream.

FIG. 4A depicts a depth map delivery format for the left view and right view depth data using a base layer of multiplexed half-resolution 3D data and two enhancement layers. In an example embodiment, EL-1 417 carries to "top" half (L') of the L' and R' top-and-bottom signal (117) and $Z_L$ data. EL-2 419 carries the "bottom" half of the L' and R' top-and-bottom signal (117) and $Z_R$ data. The coding efficiency of the enhancement layers may be improved by using a texture and a Z-buffer RPU (425 and 430). $RPU_T$ 425 is used for the coding of the L' and R' data, while $RPU_Z$ 430 is used for the coding of the $Z_L$ and $Z_R$ data. As before, the EL-1 and EL-2 chroma channels (417-UV and 419-UV) may be used to carry either chroma data for the corresponding L' or R' data (e.g., L'u and L'v), or additional depth data ($Z_L$' and $Z_L$").

Given depth map data encoded according to FIG. 4A, FIG. 4B depicts alternative decoding scenarios. Receivers with a single BL decoder 450 may decode an FC 3D stream. Receivers with an additional EL decoder (455 or 460) and $RPU_T$ and $RPU_Z$ (or similar) functionality can also decode either a full-resolution (FR) left view stream, a half-resolution (HR) right-view stream, and left view depth data ($Z_L$), or they can decode an FR right view, an HR left view, and right view depth data ($Z_R$). Receivers with two additional EL decoders (455 and 460) can also decode an FCFR 3D stream and the depth data from both views.

FIG. 7A depicts an example embodiment of a dual-layer approach for delivering depth map information using a base layer 712 and an enhancement layer 717. BL layer 712 delivers a half resolution of both views (e.g., a side-by-side picture). EL Layer 717 delivers their corresponding depth maps. The encoder may utilize $RPU_Z$ (730) so that depth map data extracted from BL 712 may be used as a reference to encode EL data 717.

In some embodiments, $RPU_Z$ 730 may be skipped all together, and the EL layer 717 may be encoded on its own, as a second base layer, with no reference to the base layer.

In some embodiments, $RPU_Z$ 730 may utilize information from base layer 712 to extract estimate depth data $ZE_L$ and $ZE_R$. Then, enhancement layer 717, instead of comprising the original $Z_L$ and $Z_R$ depth data, it may instead comprise depth-map residual values, such as $RZ_L=Z_L-ZE_L$ and $RZ_R=Z_R-ZE_R$.

Given the encoder format depicted in FIG. 7A, FIG. 7B depicts alternative decoding embodiments. Receivers with a single BL decoder 735 may decode an FC 3D stream. Receivers with an additional EL decoder (745) may also decode the corresponding $Z_L$ and $Z_R$ depth map data.

In another embodiment, instead of using the side-by-side L/R data (e.g., 112) as BL layer 712, one may use the top-and-bottom L'/R' data (e.g., 117). In such an embodiment, the EL stream 717 will carry the corresponding top-and-bottom depth map data as well.

Example Depth Formats for 3D with Non-Backwards-Compatible Layer

Most of the depth-map data delivery formats described so far allow legacy receivers to decode at least a backwards-compatible, half-resolution (FC) 3D stream. When backward compatibility with a single decoder is not a requirement, then alternative embodiments may be derived.

FIG. 5 depicts an example of a single-layer approach for delivering a depth map. Signal BL 512 comprises a half-resolution left view (L) and its associated depth map ($Z_L$). The chroma channels associated with $Z_L$ (512-UV) may be used to transmit additional resolution data for $Z_L$. An encoder may also substitute and transmit half resolution right-view data (R), instead of the left-view depth data $Z_L$. On the decoder side, a video decoder with a single BL decoder can extract a half-resolution left view and its depth map or a side-by-side picture to generate an FC 3D video stream. Auxiliary data (or metadata) that contain information about the picture arrangements on a per picture basis may also be transmitted.

The same delivery format may also be used in alternative embodiments where in BL 512, the half-resolution left view (L) may be replaced by a half-resolution right view (R), or the top (L') of the top-and-bottom L'/R' signal (147), or the bottom (R') of the top-and-bottom L'/R' signal (147), and the left-view depth map is replaced by the corresponding depth-map.

FIG. 6 depicts an example embodiment of a dual-layer approach for delivering depth map information. As depicted in FIG. 6, both the BL-1 (612) and BL-2 (617) layers are coded independently of each other. BL-1 layer 612 includes a full resolution of the left view (L). BL-2 layer 617 includes a full resolution of the left-view depth map or a full resolution of the right view (R). When layer BL-2 carries depth map data $Z_L$, the corresponding chroma data (617-UV) may be left blank or carry other metadata.

Decoding this format requires at least two BL decoders; one for decoding the left-view data (L) and one for decoding either left-view depth map data or right-view data. Auxiliary data (or metadata) that contain information about the picture arrangements on a per picture basis may also be transmitted. This format allows a receiver with one decoder to reconstruct a 2D video and a receiver with two decoders to reconstruct an FCFR 3D or an FC 3D video.

In some embodiments, BL-1 (612) may carry the right view data (R) and BL-2 (617) may care either right-view depth data ($Z_R$) or left-view data (L).

FIG. 8A depict a depth map delivery format using a base layer (BL) and two enhancement layers (EL-1 and EL-2).

The base layer 812 comprises a full-resolution left view. The EL-1 layer comprises a full-resolution right view. Layers BL and EL-1 may be encoded using a traditional MVC encoder or they may also employ a texture RPU (not shown, e.g., RPU 125). Second enhancement layer EL-2 819 comprises half-resolution depth map data for both the left and the right views. The chroma component (819-B) of the EL-2 layer may also include additional depth map data to enhance the resolution of the core depth data (819-A). $RPU_Z$ 830 may provide depth map prediction data, extracted from the input full-resolution L and R pictures, which can be used to enhance the coding efficiency of the EL-2 stream.

Given the delivery format depicted in FIG. 8A, FIG. 8B depicts alternative decoding scenarios using legacy and compatible decoders. A receiver with a single BL decoder 850 may extract a 2D stream. A decoder with an MVC decoder or with an EL-decoder 855 may extract an FCFR 3D stream. A decoder with an additional EL decoder 860 (or a 3-layer MVC decoder), may also extract the left-view and right-view depth map data. A decoder with a single BL decoder 850 and EL Decoder-2 may extract a 2D stream plus corresponding depth data.

FIG. 9A depicts an embodiment for depth map delivery using a base layer 912 and two enhancement layers (917, 919). Base layer 912 comprises a half-resolution left view (L) and its corresponding depth map $Z_L$. Layer EL-1 comprises an L'/R' top-and-bottom picture (e.g., 147 image). When coding L' of EL-1 917, $RPU_T$ (925) may be used to improve coding efficiency by generating appropriate reference frames based on the L component of BL 912. EL-2 layer 919 also comprises a half-resolution right-view (R) and its corresponding depth map data $Z_R$. When coding the R component of EL-2 919, $RPU_T$ (925) may be used to generate appropriate reference frames based on the R' component of EL-1 917. The operations of $RPU_T$s 925A and 925B may be performed by the same RPU 925 or by separate RPUs. As discussed in earlier embodiments, $RPU_Z$ 930 may extract depth map data from the L, L', and R' components of the BL 912 and EL-1 917 streams to improve the coding efficiency of the $Z_R$ data in EL-2 919. In an embodiment, the BL and EL-2 layers may also be switched.

Given the delivery format depicted in FIG. 9A, FIG. 9B depicts example of decoding scenarios in a receiver. A receiver with a single BL decoder 950 may decode a half-resolution (HR) left view and half-resolution $Z_L$. A receiver with an additional EL decoder-1 955 can also decode the L'/R' top-and-bottom signal, thus, it can reconstruct a full-resolution left view (or FR right view), and a half resolution right view (or an HR left view); both of these signals can be used to recreate a 3D view. A receiver with a second EL decoder (e.g., 960) can also decode a half-resolution right-view R and a half-resolution $Z_R$, thus being able to generate an FCFR 3D signal. A receiver with a BL decoder 950 and only the second EL-Decoder 960, may decode a frame-compatible 3D signal plus depth data.

Figures 10A, 10B:
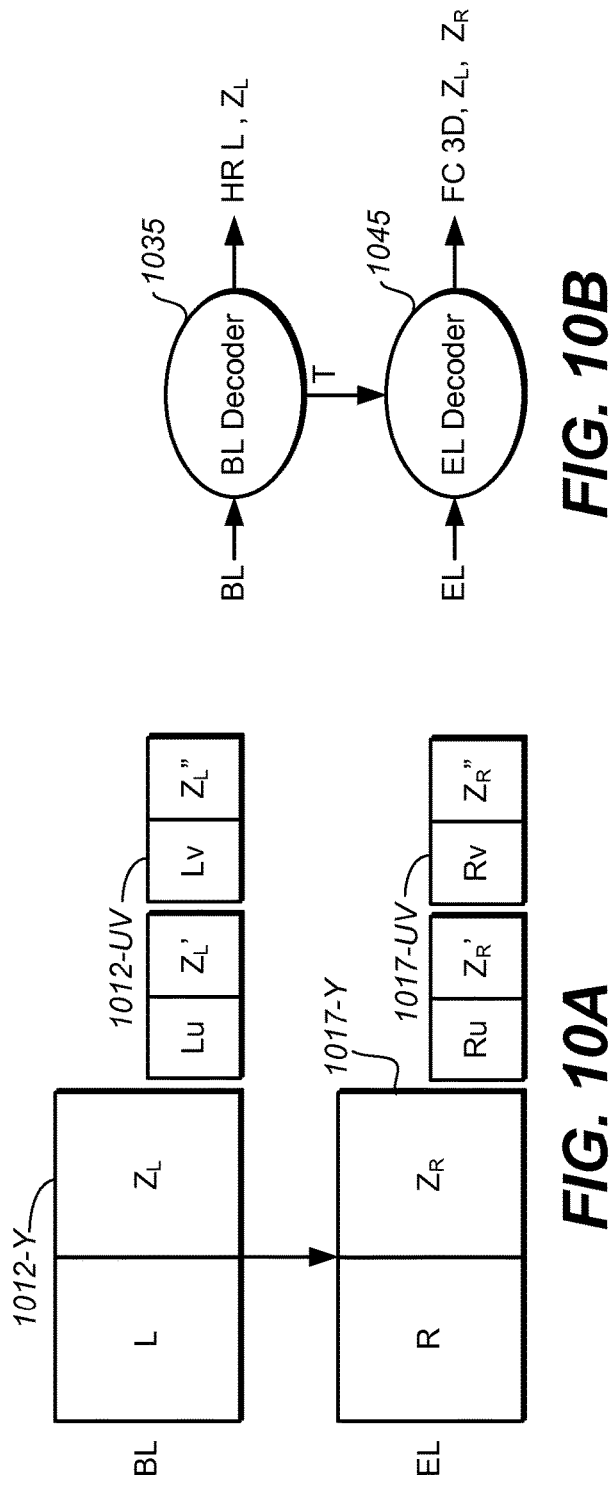
FIG. 10A depicts an example 2-layer depth map delivery format according to an embodiment of the present invention.
FIG. 10B depicts examples of corresponding bitstreams that can be extracted by suitable decoders.

FIG. 10A depicts a depth-map delivery format where a base layer BL 1012 carries a half resolution left-view and a half-resolution left-view depth map ($Z_L$), and the enhancement layer (1017) carries a half-resolution right view and a half-resolution right-view depth map ($Z_R$). The encoder may use a standard MVC encoder to encode the two layers, or alternatively it may use an $RPU_T$ (not shown) (e.g., RPU 125).

On the receiver, as depicted in FIG. 10B, a receiver with a single BL decoder 1035 may decode a half-resolution left view and its depth map. A receiver with an additional EL decoder 1045 (e.g., an MVC decoder that may or may not include a receiver RPU 140) can also decode a half-resolution right view and its depth map. By combining the two views, the receiver can render a half-resolution (or frame-rate compatible) 3D signal.

In an alternative embodiment, in FIG. 10A, in the EL stream 1017, instead of transmitting the horizontal half-resolution R signal and horizontal half-resolution $Z_R$, one may transmit the vertical half-resolution signal R' (e.g., the bottom of top-and-bottom signal 117) and a vertical half-resolution $Z_R'$. The decoder operation remains the same.

Figure 11B:
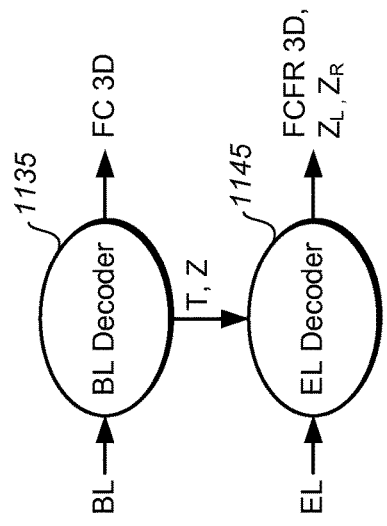
FIG. 11B depicts examples of corresponding bitstreams that can be extracted by suitable decoders.
Figure 11A:
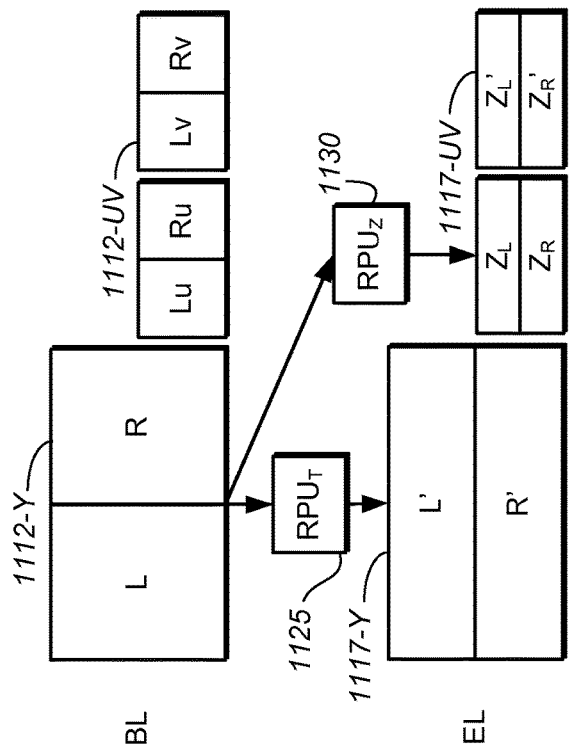
FIG. 11A depicts an example 2-layer depth map delivery format according to an embodiment of the present invention.

FIG. 11A depicts an embodiment for depth-map data delivery using two layers: BL 1112 and an EL 1117. The base layer 1112 comprises both the luma and chroma components of a side-by-side L/R picture (e.g., 112). The EL 1117 layer comprises two data sets: (a) a coded representation of the luma of the top-and-bottom L'/R' signal (e.g., 117) coded by reference to the base layer side-by-side signal using a texture RPU 1125 (1117-Y) and (b) depth map data, which are carried in the space reserved for the chroma components of the top-and-bottom signal (L'/R') (1117-UV). $Z_L$ and $Z_L'$ are both quarter resolution vertically and half resolution horizontally of the original left-view depth map. Combined, $Z_L$ and $Z_L'$ represent a quarter resolution of the original left-view depth map, e.g., half resolution in both horizontal and vertical directions. On the decoder, the chroma data associated with the top-and-bottom picture (1117-Y) may be interpolated using the chroma data from the side-by-side picture (e.g., 1112-UV).

As depicted in FIG. 11B, a receiver with a single BL decoder 1135 may decode an FC 3D signal. A receiver with a dual layer decoder may also decode the top-and-bottom L'/R' signal and the depth map data, thus being able to reconstruct an FCFR 3D signal and depth map data for both views.

FIG. 12A depicts an example embodiment for a depth map delivery format using a single layer. The layer 1205A comprises both the full resolution, left and right views (L and R), and their corresponding full-resolution depth map data ($Z_L$ and $Z_R$). In some embodiment, the L and R views may be subdivided into sub-pictures of lower resolution to accommodate legacy displays. For example, a 4K resolution picture may contain four 2K sub-pictures, or a 2K sub-picture may carry four quarter-resolution pictures. As depicted in FIG. 12A, the chroma channel 1205-UV may carry both chroma data and additional depth-map data (e.g., $Z_L'$ and $Z_R'$).

As depicted in FIG. 12A, image data (e.g. L or R) and their corresponding depth data (e.g., $Z_L$ or $Z_R$) may be vertically aligned. In another embodiment, depicted in FIG. 12B, image data and their corresponding depth data may also be aligned horizontally.

FIG. 13A depicts an example embodiment for a dual-layer depth map delivery format. This format is similar to the format depicted in FIG. 7, however, instead of carrying half-resolution left and right views; this method carries full-resolution data, in both the base layer (1305) and the enhancement layer (1325). The L and R pictures may be transmitted at double the frame rate. $RPU_Z$ 1330 may be used to improve the coding efficiency of the enhancement layer by predicting depth map data from the base layer and using them as alternative reference frames for encoding the enhancement layer.

Some embodiments may skip the $RPU_Z$ 1330 and encode depth-map data 1325 on its own as another base layer.

In some embodiments, $RPU_Z$ 1330 may utilize information from base layer 1305 to extract estimate depth data $ZE_L$ and $ZE_R$. Then, enhancement layer 1325, instead of comprising the original $Z_L$ and $Z_R$ depth data, it may instead comprise depth-map residual values, such as $RZ_L=Z_L-ZE_L$ and $RZ_R=Z_R-ZE_R$.

Given the delivery format depicted in FIG. 13A, FIG. 13B depicts alternative receiver configurations. A receiver with a single BL decoder 1335 may decode a full-resolution 3D stream. A receiver with an additional EL decoder 1345 may also decode the corresponding depth data.

Figure 14:
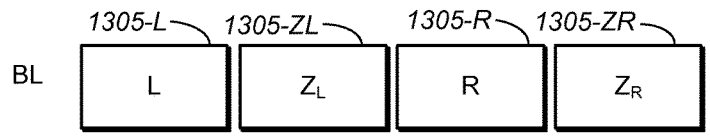
FIG. 14 depicts an example single layer depth map delivery format according to an embodiment of the present invention.

FIG. 14 depicts an example embodiment for a single-layer transmission format for carrying both picture data and depth-map data. Picture data and depth data are transmitted in an interleaved manner, for instance, at a frame or scene level. Pictures may be transmitted at a speed rate four times the frame rate of each view. Base layer 1305 may comprise the following layer components: a full-resolution left view 1305-L, a full resolution left depth map 1305-ZL, a full-resolution right view 1305-R, and a full resolution right depth map 1305-ZR. Some embodiments may decide to selectively skip components of the 1305 layer. For example, an encoder may transmit all left and right views (L+R) for a collection of video frames (e.g., a movie scene), but transmit depth-map data only at the beginning of the scene. Alternatively, an encoder may only transmit $L+Z_L$ or $R+Z_R$ data. Additional metadata in the format may indicate to the decoder the sequence of layer components.

Asymmetric Spatial Multiplexing

Figure 15A:
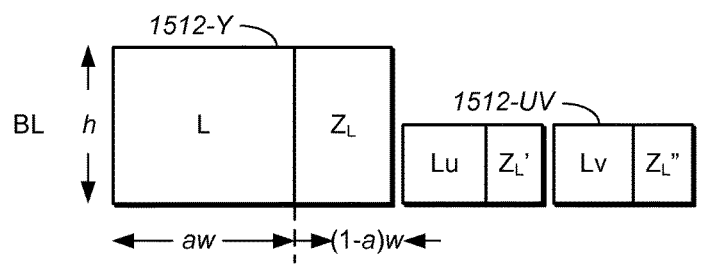
FIG. 15A and FIG. 15B depict example single layer depth map delivery formats according to embodiments of the present invention.

FIG. 15A depicts an example of a single-layer approach for delivering a depth map according to an embodiment. This approach is similar to single or dual-layer approaches depicted earlier (e.g., FIG. 5, FIG. 9A, and FIG. 10A), except that it uses asymmetric spatial multiplexing; that is, in a multiplexed picture that combines both a picture view and its associated depth map (e.g., 1512), the resolutions of the picture view (e.g., the left view (L)) and its associated depth map (e.g., $Z_L$) have unequal sizes.

Given a multiplexed input frame (e.g., 1512) with a pixel resolution h×w (e.g., h=1080 and w=1920), in an embodiment, the sub-sampled left view (L) may be allocated more pixels than its associated depth map. Thus, given a scale a, where $1>a\geq\frac{1}{2}$, the original left view picture may be scaled (e.g., sub-sampled) to a size h×aw, while the depth map may be scaled to a size h×(1−a) w. This approach may result in sharper 3D pictures than symmetric left and right view pictures (e.g., when $a=\frac{1}{2}$).

As discussed earlier, optionally, additional depth data (e.g., $Z_{L'}$, and $Z_{L''}$) may also be embedded in the corresponding chroma components of the coded frame (e.g., 1512-UV).

In an embodiment, backward compatibility may be achieved by defining the active area of the picture (e.g., h×aw) by using cropping rectangle and aspect ratio syntax parameters in the encoding bitstream, similar to those defined in AVC/H.264 or the upcoming HEVC video coding standard. Under such an implementation, a legacy 2D receiver may extract, decode, and display only the picture area (e.g., L) defined by these parameters and ignore the depth map information (e.g., $Z_L$). Receivers with 3D capability may decode the whole picture, determine the picture areas and depth-map areas using the cropping parameters, and then use the depth map information to render multiple views. The 3D receiver can scale the 2D picture and depth as needed using the received cropping and aspect ratio parameters. Auxiliary data (or metadata) that contain information about the picture arrangements on a per picture basis may also be transmitted.

Figure 15B:
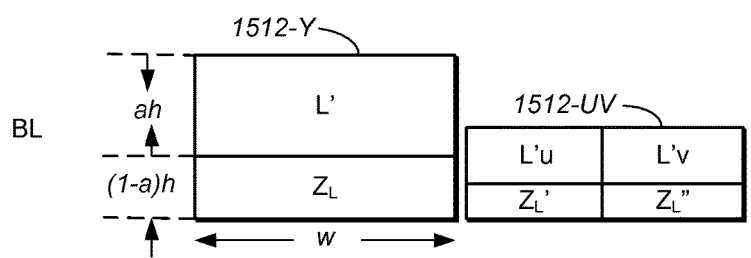

The same delivery format may also be used in alternative embodiments where in BL 1512, the sub-resolution left view (L) may be replaced by a sub-resolution right view (R), or scaled versions of the top (L') of the top-and-bottom L'/R' signal (147), or the bottom (R') of the top-and-bottom L'/R' signal (147), and the left-view depth map is replaced by the corresponding depth-map. In some embodiments (e.g., as shown in FIG. 4A and FIG. 15B), the asymmetric spatial multiplexing may also be applied in the vertical direction. In some embodiments (not shown), the asymmetric spatial multiplexing may be applied to both the horizontal and vertical directions.

Figure 15C:
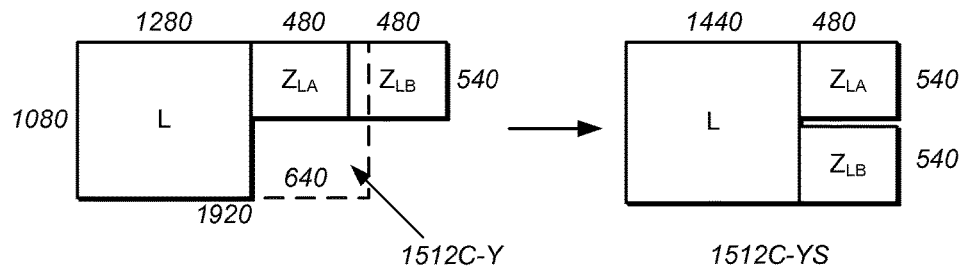
FIG. 15C depicts an example of segmented depth map multiplexing according to an embodiment of the present invention.

In an embodiment, FIG. 15C depicts an example of an alternative depth delivery format based on segmented depth maps. Such embodiments allow the aspect ratios of the transmitted depth maps to match more closely the aspect ratios of the transmitted image views. As an example, consider an input 1080×1920 image and an asymmetric multiplexing format as depicted in FIG. 15A, where, without limitation, $a=\frac{2}{3}$. Then, in an embodiment, the luminance signal 1512-Y (or 1512C-Y) may comprise one view (e.g., the left view L) scaled at a 1080×1280 resolution, and the corresponding depth map (e.g., $Z_L$) scaled at a 1080×640 resolution. In some embodiments, it may be more beneficial to transmit a 540×960 depth map, which better matches the original aspect ratio. Such a depth map may be segmented horizontally into two continuous parts (e.g., $Z_{LA}$ and $Z_{LB}$), which, as depicted in FIG. 15C, may be multiplexed by stacking them one on top of the other. Hence, in an example embodiment, the luminance signal 1512C-YS may comprise two multiplexed parts: an image part (e.g., the left view L) scaled at a first resolution (e.g., 1080×1440) and two or more depth map segments multiplexed together to form a depth map part. In an example, the two depth map segments of a 540×960 input depth map (e.g., 540×480 $Z_{LA}$ and 540×480 $Z_{LB}$) may be stacked vertically.

In some embodiments, a depth map may be segmented into more than two segments. In some embodiments, a depth map may be segmented across the vertical direction. In some embodiments, a depth map may be segmented across both the vertical and horizontal directions. In some embodiments, the depth map may be segmented into unequal segments. In some embodiments, the segments may be stacked horizontally, vertically, or both vertically and horizontally.

In some embodiments, one or more of the segmented depth maps may be flipped horizontally or vertically before being stored as part of the multiplexed image. Experiments have shown that such flipping reduces the coding artifacts at the borders between the texture part and the depth parts of the coded multiplexed image (e.g., 1512C-YS). Furthermore, there are fewer coding artifacts at the center of the split depth-map image.

In an example embodiment, let d[i,j] denote pixel values of a segment of a depth map (e.g., $Z_{LB}$). Let $D_w$ denote the width of this segment. If the pixels values of this segment are flipped across the left vertical axis, then, for the i-th row, the pixel values of the horizontally flipped segment (d_M[i,j]) may be determined as:

for (j=0; j<Dw; j++)
  d_hf[i,j]=d[i,Dw−j];

A decoder receiving image with segmented depth maps (e.g., 1512C-YS) may use metadata to properly align all the decoded depth map segments to reconstruct the original depth map (e.g., $Z_L$), and thus re-generate a proper 3D output image. Any flipped depth-map segments will need to be flipped back to their original orientation before being used for rendering the final output.

In some embodiments, asymmetric spatial multiplexing and depth map segmentation may also be applied to depth delivery formats that include both image views of the input image (e.g., FIG. 12A and FIG. 12B).

Alternative Three-Layer Delivery Formats

Figure 16B:
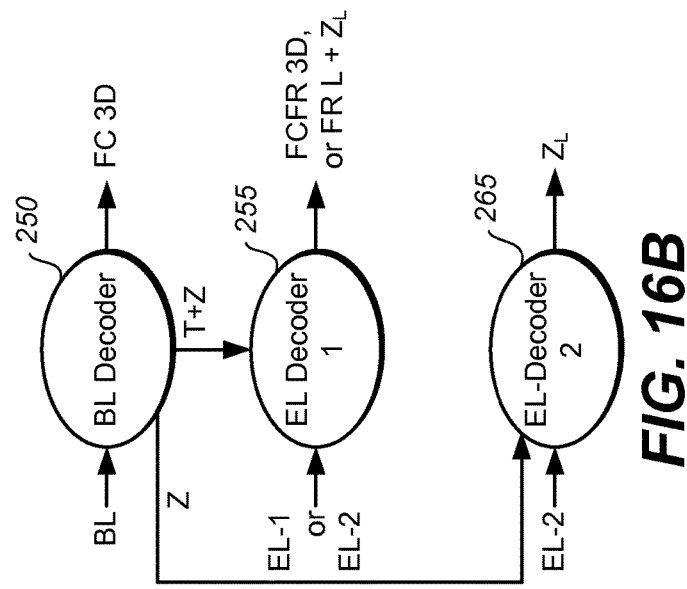
FIGS. 16A-16E depict example 3-layer depth map delivery formats according to embodiments of the present invention.
Figure 16A:
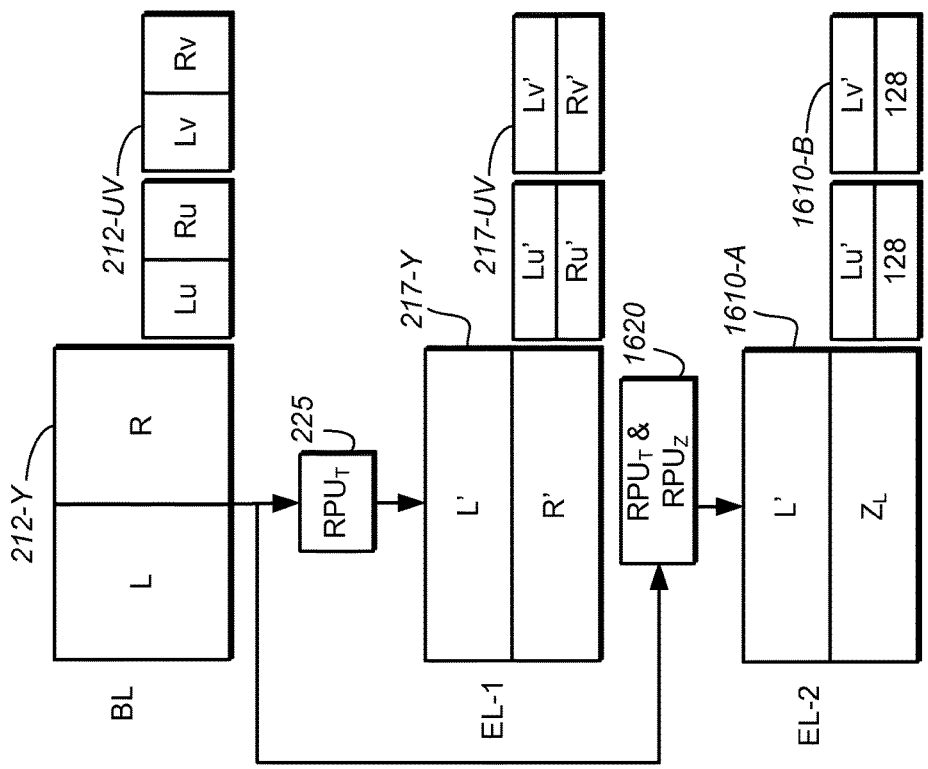

FIG. 16A depicts another example for transmitting 3D video and depth data according to an embodiment based on a three-layer delivery format. FIG. 16A may be considered a variation of the embodiments depicted in FIG. 2A and FIG. 2C. As depicted in FIG. 16A, the first two layers, BL 212 and EL-1 217, correspond to the traditional 3D FCFR layers BL 112 and EL 117. Layer EL-2 1610 is coded independently from EL-1 217 based on prediction data from BL 212 using an $RPU_T$ and an optional $RPU_Z$ (1620), which may correspond to $RPU_T$ 225 and $RPU_Z$ 230. In this example, the same L' video data (or alternatively R' data) are coded in both the EL-1 and EL-2 layers. As depicted in FIG. 16B, in a receiver with two only decoders (e.g., BL Decoder 250 and EL Decoder-1 255), users can selectively decode either the BL and EL-1 streams, to generate an FCFR 3D stream, or the BL and EL-2 streams to generate an FR stream and depth data suitable for an auto-stereoscopic display (e.g., FR L+$Z_L$). A receiver with all three decoders can generate both FCFR 3D data and $Z_L$ data.

In an embodiment, the $RPU_Z$ process of 1620 can be eliminated. An encoder may simply use a constant flat gray value to predict $Z_L$ depth data during the coding process of the EL-2 1610 layer (e.g., all pixel values of the predictor may be set equal to 128 for 8-bit pictures).

Figure 16C:
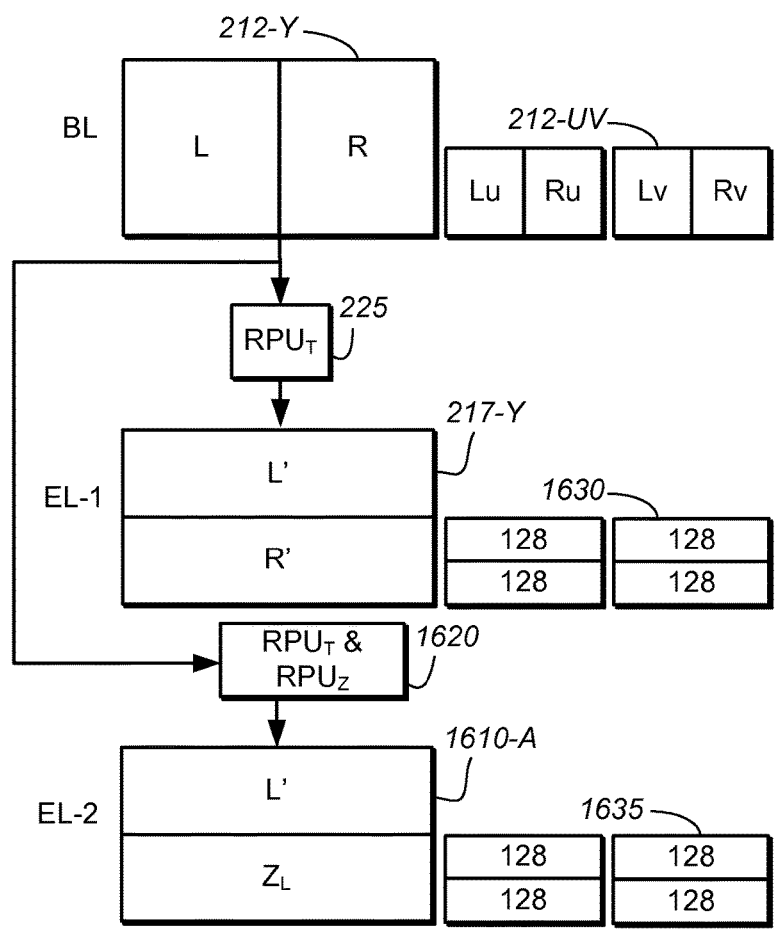

FIG. 16C depicts another example for delivering 3D video and depth data according to an embodiment. This embodiment is similar to the one depicted in FIG. 16A; however, neither of the EL streams carry any chroma data. In an embodiment, all chroma information in EL-1 (1630) and EL-2 (1635) is set to a fixed value (e.g. 128 for 8-bit pictures). Experiments show that this has minimal impact on visual quality while it provides significant saving in overall bit rate. Chroma data can still be reconstructed based on the chroma data of the BL stream (212-UV). For proper decoding, the encoder RPU may need to notify the decoder (e.g., through RPU signaling or other metadata) to ignore any decoded chroma data in the EL-1 or EL-2 streams.

Figure 16E:
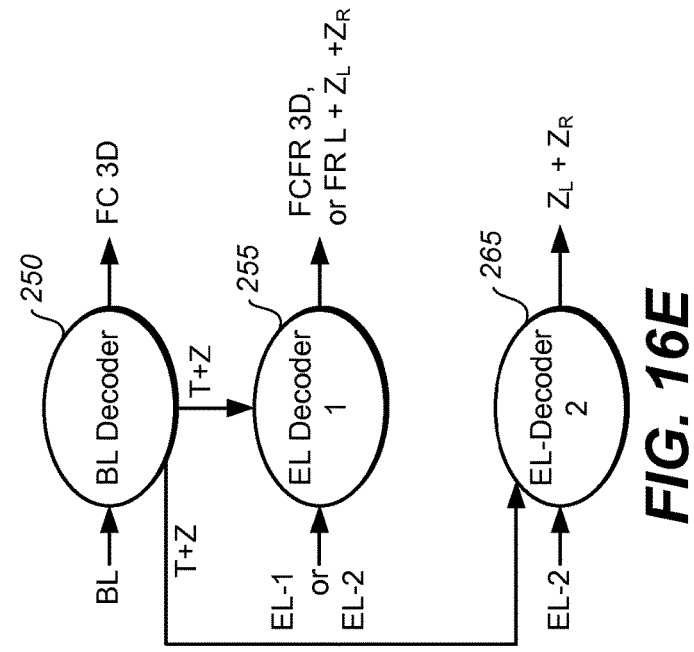
Figure 16D:
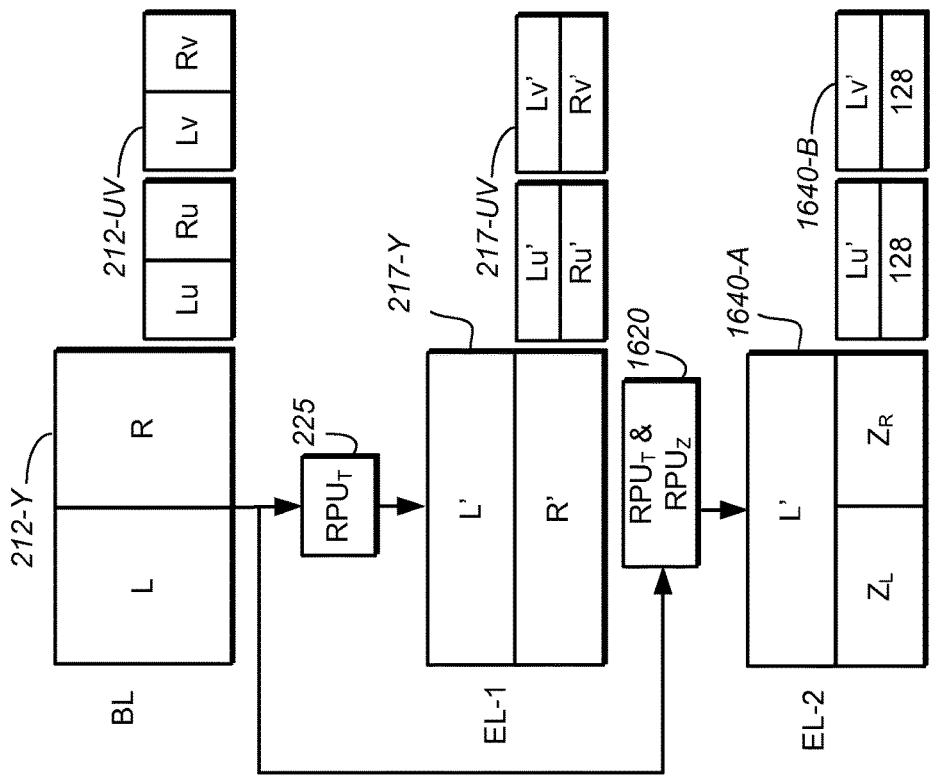

FIG. 16D depicts another example variation of FIG. 16A where both $Z_L$ and $Z_R$ data are carried in the EL-2 signal 1640, but each at reduced vertical and horizontal resolutions. As depicted in FIG. 16E, a receiver with two decoders may now decode either an FCFR 3D signal or an FC 3D signal with left and right depth data for auto-stereoscopic 3D applications.

Alternative Two-Layer FCFR Delivery Formats with Depth Map Data

Figure 17A:
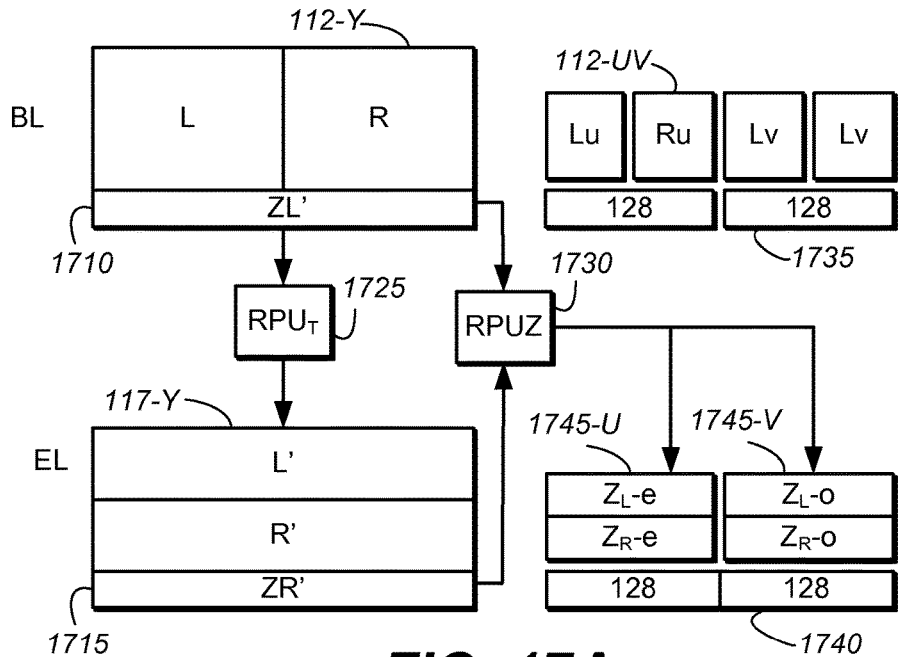
FIGS. 17A-17B depict example 2-layer depth map delivery formats according to embodiments of the present invention.

FIG. 17A depicts another example for transmitting 3D video and depth data according to an embodiment based on a two-layer delivery format. In many compression standards, such as H.264, the size of the encoded picture in a video sequence has to be an integer multiple of a predefined macroblock size (e.g., 16×16). If this is not the case, then extra pixels are added at the bottom and/or the sides of the picture to modify the picture size accordingly. As an example, consider the coding of HD signals with size 1920×1080. 1920 is a multiple of 16; however, 1080 is not. In an example embodiment, each picture of such a stream may be padded by 8 extra rows to form a 1920×1088 picture. As depicted in FIG. 17A, in an embodiment, this padding (e.g., 1710 and 1715) can be used to transmit depth data.

As depicted in FIG. 17A, in an embodiment, the base layer (BL) comprises two parts: a side-by-side (e.g., 1920× 1080) multiplexed picture (112) and a subsampled version of depth data for either the left view or the right view (e.g., 1920×8 ZL' 1710). Because depth data have no chroma information, in an embodiment, chroma-related data for the extra padding rows of the BL signal (1735) may be simply set to a constant value (e.g., 128).

In an embodiment, signal ZL' 1710 may be created as follows. Let $Z_L$ denote a high-resolution left-view depth data signal (e.g., 960×540). This signal may be filtered and sub-sampled both horizontally and vertically to generate a sub-sampled version that can fit within the resolution of the padding data (e.g., 1920×8). For example, given a 960×540 signal one may generate a 240×60 signal ZL'. Then one can pack the 240*60=14,400 ZL' bytes into the available space of 1920*8=15,360 bytes using any suitable packing scheme.

As depicted in FIG. 17A, in an embodiment, the enhancement layer (EL) comprises top-and-bottom data luminance data (117-Y), lower resolution left view or right view depth data (e.g., ZR' 1715), and high-resolution left-view and right-view depth data (1745-U and 1745-V). For example, in the luminance signal, ZR' 1715 may comprise a 240×60 sub-sampled version of the original $Z_R$ depth data, packed into the 1920×8 padding area. For chroma (1745), instead of transmitting the chroma of the top-and-bottom signal (117) one may transmit high resolution $Z_R$ and $Z_L$ depth data. In an embodiment, instead of transmitting the U (or Cb) chroma data, one may transmit the even columns of $Z_R$ and $Z_L$ ($Z_R$-e, $Z_L$-e 1745-U) and instead of transmitting the V (or Cr) data of 117 one may transmit the odd columns of $Z_R$ and $Z_L$ ($Z_R$-o, $Z_L$-o 1745-V). As in the BL, ZR' data 1715 have no chroma information hence their corresponding chroma data (1740) may be set to a fixed value (e.g., 128).

Because of the inter-layer prediction requirements and the sequential nature of coding and decoding macroblock data, in practice, at least depth data ZR' (1715) for a frame coded at time t may actually represent depth data for a previously coded frame, say at time t-1 or earlier. This delay may be necessary to allow $RPU_Z$ 1730 to fully reconstruct all depth data (e.g., ZR') needed to code (or decode) $Z_L$ and $Z_R$ in the enhancement layer (1765). For example, during encoding, at time $T_0$, the EL($T_0$) frame may comprise dummy ZR' data (e.g., all values are set equal to 128). Then, the EL($T_1$) frame may comprise depth data of the $T_0$ frame, the EL($T_2$) frame may comprise depth data of the $T_1$ frame, and so forth. During decoding, the dummy depth data of the first decoded frame will be ignored and depth-data will be recovered with at least a one-frame delay.

The luminance of EL can be encoded on its own using a second EL encoder or, as depicted in FIG. 17A, it can be encoded using texture $RPU_T$ 1725 with reference to the base layer. A depth map $RPU_Z$ (1730) may also be used so that the high-resolution depth data in the "chroma" space of EL may be coded by taking into consideration the sub-sampled ZL' (1710) and ZR' data (1715). For example, in an embodiment, $RPU_Z$ (1730) may comprise a simple up-sampler.

Given the bit streams depicted in FIG. 17A, a single decoder can decode the BL stream and extract a frame compatible (FC) 3D stream plus sub-sampled depth data for one of the views. A dual-layer (e.g., MVC) decoder may decode an FCFR 3D stream plus $Z_L$ and $Z_R$ depth data.

Figure 17B:
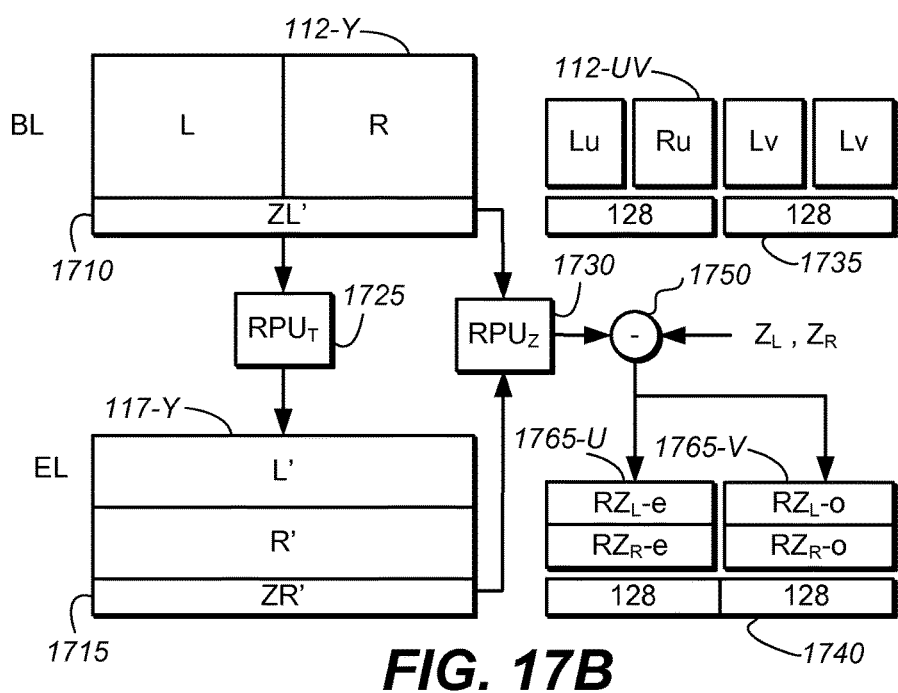

FIG. 17B depicts a variation of the depth map delivery format depicted in FIG. 17A. To improve coding efficiency, instead of coding the original depth data $Z_L$ and $Z_R$, (1745-U and 1745-V) an encoder may use the depth $RPU_Z$ 1730 to generate and code the depth residuals $RZ_L = Z_L - ZP_L$ and $RZ_R = Z_R - ZP_R$, where $ZP_L$ and $ZP_R$ denoted predicted $Z_L$ and $Z_R$ data based on the ZL' (1710) and ZR' (1715) signals. These depth residuals are then coded as part of the "chroma" information (1765-U and 1765-V) in the EL stream. In an embodiment, during the coding and decoding processes, residual depth map data $RZ_L$ and $RZ_R$ data (1765) may be coded (or decoded) with reference to either prior coded residual depth map data or to a fixed value, say 128; hence, they have no dependencies to the coded ZR' (1715) and ZL' (1710) data and there is no requirement to use ZR' depth data from a previously coded frame as discussed earlier.

In another embodiment, the EL streams as depicted in FIG. 17A or FIG. 17B may include depth data in only parts of the EL-U (1745-U or 1765-U) or EL-V (1745-V or 1765-V) regions. For example, the $Z_R$-o, $Z_L$-o 1745-V streams or the $RZ_R$-o, $RZ_L$-o 1765-V streams may be replaced by a constant value (e.g., 128). This approach reduces the bit rate requirements at the expense of lower depth map resolution.

Another approach to reduce bit rate requirements comprises transmitting depth map data for only one view (say, $Z_R$). In such a scenario, all data for the other view depth region (say, $Z_L$) may be filled with a constant value (e.g., 128). Alternatively, one may transmit depth map data for a single view (say, $Z_R$) at double the resolution than before. For example, in an embodiment, $Z_L$-o and $Z_L$-e depth data may be replaced by additional $Z_R$ data.

Both FIG. 17A and FIG. 17B depict embodiments where the base layer comprises a side-by-side stream and the enhancement layer comprises a top-and-bottom stream. In other embodiments, the same process may be applied to a system where the BL comprises a top-and-bottom stream and the EL comprises the side-by-side stream.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to encoding and decoding depth map delivery formats, such as those described herein. The computer and/or IC may compute any of a variety of parameters or values that relate to encoding and decoding depth map delivery formats as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for encoding and decoding depth map delivery formats as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to encoding and decoding depth map delivery formats are thus described. In the foregoing specification, embodiments of the present invention have been described with reference to numerous specific details that may vary from implementation to implementation. Thus, the sole and exclusive indicator of what is the invention, and is intended by the applicants to be the invention, is the set as recited in Claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for delivering 3D depth map data, the method comprising:
    accessing an input stereoscopic picture and input depth data, wherein the input stereoscopic picture comprises input image data of a first view and input image data of a second view different from the first view;
    generating an image data partition of a first spatial size in response to the input image data of the first view in the input stereoscopic picture, wherein the image data partition comprises image data of the first view, wherein the image data of the first view is derived from the input image data of the first view in the input stereoscopic picture;
    generating a depth map data partition in response to the input depth data, wherein the depth map data partition has a second spatial size smaller than the first spatial size;
    multiplexing the image data partition and the depth map data partition to form a multiplexed output picture, wherein the multiplexed output picture is free of image data derived from the input image data of the second view; and
    encoding, using an encoder, the multiplexed output picture to generate a coded bitstream;
    wherein the coded bitstream includes the image data partition of only the first view and the depth map data partition of only the first view;
    wherein the coded bitstream is free of image data of views other than the first view.

2. The method of claim 1, wherein the image data partition and the depth map data partition have equal horizontal resolutions.

3. The method of claim 1, wherein the image data partition has a higher horizontal resolution than the depth map data partition.

4. The method of claim 1, wherein the image data partition is based on a first view or a second view of the input stereoscopic picture and the depth map data partition is based on the depth data of a first view or a second view of the input stereoscopic picture.

5. A method for delivering 3D depth map data, the method comprising:
   accessing an input stereoscopic picture and input depth data, wherein the input stereoscopic picture comprises input image data of a first view and input image data of a second view different from the first view;
   generating an image data partition of a first spatial size in response to the input image data of the first view in the input stereoscopic picture, wherein the image data partition comprises image data of the first view, wherein the image data of the first view is derived from the input image data of the first view in the input stereoscopic picture;
   generating a scaled depth map in response to the input depth data;
   segmenting the scaled depth map to two or more depth map segments;
   generating a depth map partition comprising two or more of the depth map segments, wherein the depth map data partition has a second spatial size smaller than the first spatial size;
   multiplexing the image data partition and the depth map data partition to form a multiplexed output picture, wherein a position of at least one depth map segment in the depth map partition is shifted relatively to its original position in the scaled depth map, wherein the multiplexed output picture is free of image data derived from the input image data of the second view; and
   encoding, using an encoder, the multiplexed output picture to generate a coded bitstream;
   wherein the coded bitstream includes the image data partition of only the first view and the depth map data partition of only the first view;
   wherein the coded bitstream is free of image data of views other than the first view.

6. The method of claim 5, wherein the scaled depth image is segmented across a horizontal direction or a vertical direction.

7. The method of claim 5, wherein generating the depth map data partition comprises positioning at least two of the depth map segments vertically, wherein the at least two of the depth map segments were positioned horizontally in the scaled depth map.

8. The method of claim 5, wherein generating the depth map data partition comprises positioning at least two of the depth map segments horizontally, wherein the at least two of the depth map segments were positioned vertically in the scaled depth map.

9. A method for decoding 3D depth map data, the method comprising:
   decoding a coded bitstream to generate, from a multiplexed picture encoded in the coded bitstream, an image data partition and a depth map data partition, wherein the depth map data partition comprises a shifted depth map segment located in a first spatial position;
   wherein the image data partition comprises image data of a first view, wherein the image data of the first view in the image data partition has been derived from input image data of the first view in a stereoscopic picture that comprises the input image data of the first view and input image data of a second view different from the first view, wherein the multiplexed output picture is free of image data derived from the input image data of the second view;
   wherein the coded bitstream includes the image data partition of only the first view and the depth map data partition of only the first view;
   wherein the coded bitstream was free of image data of views other than the first view;
   shifting the shifted depth map segment from the first spatial position to a second spatial position to generate a depth map segment in a second spatial position smaller than the first spatial position; and
   generating a decoded output signal in response to at least the image data partition and the depth map segment in the second spatial position.

10. The method of claim 5, further comprising flipping horizontally or vertically at least one depth map segment in the depth map partition before the encoding step.

11. The method of claim 9, further comprising flipping horizontally or vertically the shifted depth map segment before generating the decoded output signal.

12. A non-transitory computer readable medium storing computer instructions which, when executed by one or more computing processors, cause the one or more computing processors to perform the method of claim 1.

13. A non-transitory computer readable medium storing computer instructions which, when executed by one or more computing processors, cause the one or more computing processors to perform the method of claim 5.

14. A non-transitory computer readable medium storing computer instructions which, when executed by one or more computing processors, cause the one or more computing processors to perform the method of claim 9.

15. An apparatus comprising:
   one or more computing processors;
   a non-transitory computer readable medium that stores computer instructions which, when executed by the one or more computing processors, cause the one or more computing processors to perform the method of claim 1.

16. An apparatus comprising:
   one or more computing processors;
   a non-transitory computer readable medium that stores computer instructions which, when executed by the one or more computing processors, cause the one or more computing processors to perform the method of claim 5.

17. An apparatus comprising:
   one or more computing processors;
   a non-transitory computer readable medium that stores computer instructions which, when executed by the one or more computing processors, cause the one or more computing processors to perform the method of claim 9.

18. The method of claim 1, wherein the depth map data partition has multiple portions that are embedded in luma and chroma components of the multiplexed output picture.

19. The method of claim 5, wherein the depth map data partition has multiple portions that are embedded in luma and chroma components of the multiplexed output picture.

20. The method of claim 9, wherein the depth map data partition has multiple portions that are embedded in luma and chroma components of the multiplexed picture.

* * * * *